(12) United States Patent
Ito et al.

(10) Patent No.: US 6,520,136 B2
(45) Date of Patent: Feb. 18, 2003

(54) WARM-UP CONTROL DEVICE FOR INTERNAL-COMBUSTION ENGINE AND WARM-UP CONTROL METHOD

(75) Inventors: Yasushi Ito, Susono (JP); Makoto Suzuki, Mishima (JP); Katuhiko Arisawa, Susono (JP); Masakazu Tabata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/949,959

(22) Filed: Sep. 12, 2001

(65) Prior Publication Data

US 2002/0029755 A1 Mar. 14, 2002

(30) Foreign Application Priority Data

Sep. 13, 2000 (JP) ........................................ 2000-283792
Nov. 6, 2000 (JP) ........................................ 2000-338043

(51) Int. Cl.[7] .............................................. F02N 17/02
(52) U.S. Cl. .............................................. 123/142.5 R
(58) Field of Search .................... 123/142.5 R; 701/113

(56) References Cited

FOREIGN PATENT DOCUMENTS

| JP | 6-185359 | 7/1994 |
|---|---|---|
| JP | 10-71837 | 3/1998 |
| JP | 10-77834 | 3/1998 |

Primary Examiner—Noah P. Kamen
(74) Attorney, Agent, or Firm—Oliff & Berridge PLC

(57) ABSTRACT

A warm-up control device for an internal-combustion engine comprises a heat storage device for storing a heating medium heated during operation of the engine, supplies the heating medium stored in the heat storage device to a drive device (a transmission and the like) prior to the start of the engine or:at the start of the engine, and supplies the heating medium stored in the heat storage device to the drive device while maintaining a condition where the heating medium is circulated in the path excluding the heat storage device and including the drive device after the start of the engine.

The warm-up control device supplies the heating medium heat-insulated and stored in the heat storage device during operation of the engine, and sets the ratio between the amount of the heating medium supplied from the heat storage device to the and the amount of the heating medium supplied from the heat storage device to the drive device, on the basis of the temperature of the engine and the temperature of the drive device.

At the start of the internal-combustion engine, the heating medium can be supplied to the engine or the drive device efficiently, and the warm-up can be performed as required.

18 Claims, 21 Drawing Sheets

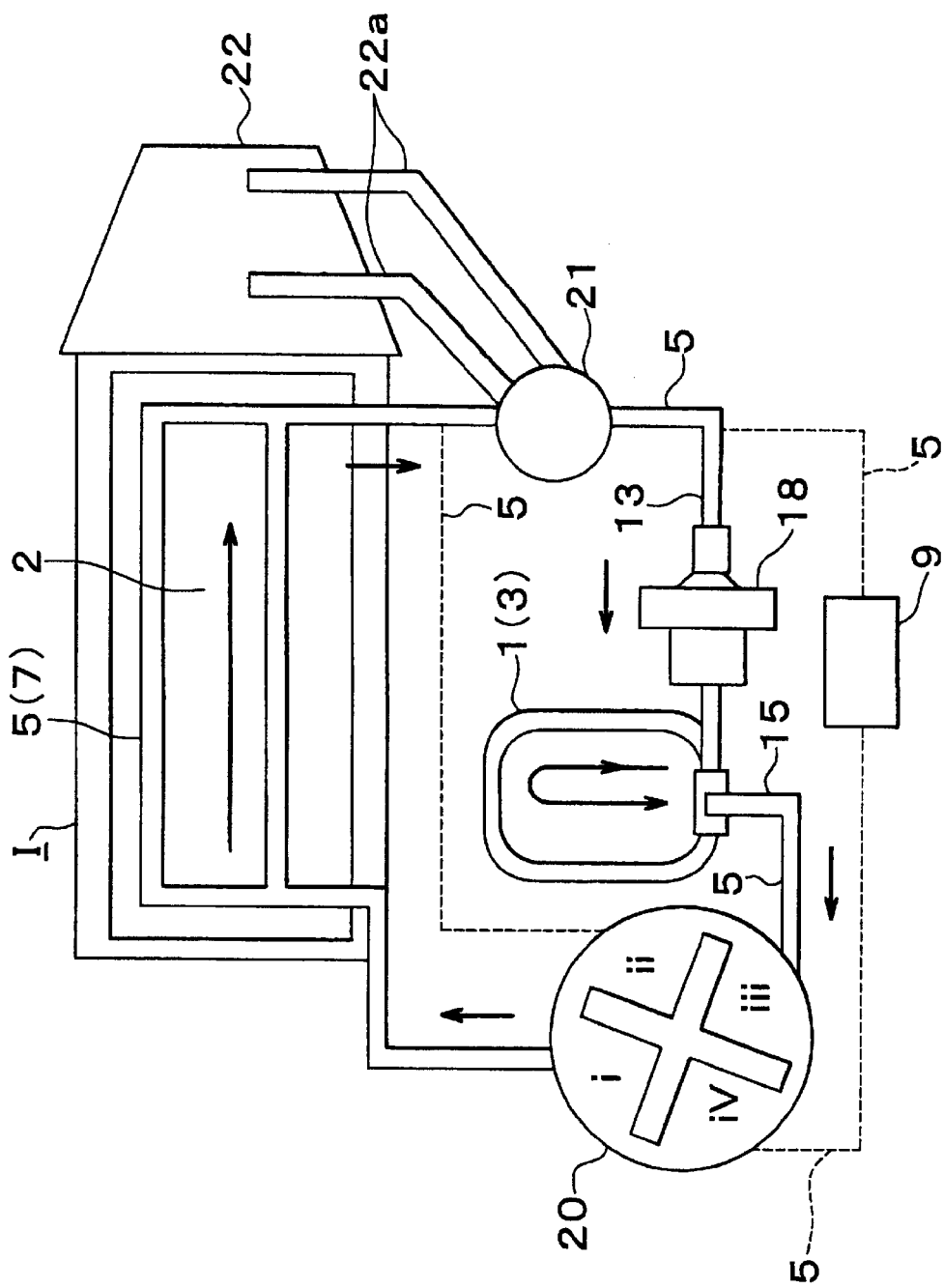

WARM-UP CONTROL DEVICE FOR INTERNAL-COMBUSTION ENGINE AND WARM-UP CONTROL METHOD

INCORPORATION BY REFERENCE

The disclosure of Japanese Patent Application No. 2000-283792 filed on Sep. 13, 2000 and 2000-338043 filed on Nov. 6, 2000 including the specification, drawings and abstract is incorporated herein by reference in its entirety.

BACKGROUND OF THE INVENTION

1. Field of the Invention

The invention relates to a warm-up control device having a heat storage device for warming up an internal-combustion engine quickly by utilizing a technique for storing heat using an heat insulating container.

2. Description of the Related Art

As an example of this kind of warm-up control device, Japanese Patent Application Laid-Open No. 10-71837 discloses a configuration in which coolant heat-insulated and stored in an heat insulating container as a heat storage device warms up an internal-combustion engine after flowing through an intake air heat exchanger, a heat exchanger with respect to lubricating oil in the internal-combustion engine, and a heat exchanger with respect to hydraulic fluid in an automatic transmission during warm-up, and the engine coolant in the heat insulating container circulates between the heat insulating container and the internal-combustion engine during warm-up.

Japanese Application Patent Laid-open No. 10-77834 discloses another configuration, in which coolant heat-insulated and stored in a heat storage device is used for heating engine intake air, engine oil, and automatic transmission fluid during warm-up after the start of the engine, and after warm-up (after the engine coolant temperature is increased to a predetermined value), the heating of the engine intake air by the coolant is stopped.

However, the Japanese Application Patent Laid-open No. 1.0-71837 does not teach how to circulate the engine coolant between the heat insulating container of the heat storage device and the engine. In addition, the warm-up of the engine may be delayed.

On the other hand, in the warm-up control device in the Japanese Patent Application Laid-Open No. 10-77834, heating of engine oil and heating of transmission fluid are always conducted simultaneously, and the ratio between the amount of coolant used for heating engine oil and the amount of coolant used for heating transmission fluid is fixed. Therefore, the effect of promoting the warm-up of engine oil and the effect of promoting the warm-up of transmission fluid are constant.

Actually, however, in an automotive engine, it is sometimes preferable that priority is given to either the warm-up of the engine or the warm-up of the transmission.

For example, if the warm-up of an engine is insufficient, the engine emission properties may deteriorate or the drivability may deteriorate. On the other hand, if the warm-up of a transmission is insufficient, the fuel efficiency may deteriorate due to the increase in friction loss. Depending on the use application of the engine, however, improvement of the emission properties and the drivability may take priority over the fuel efficiency, or the fuel efficiency may take priority during operation. In such cases, it is preferable that priority is given to the warm-up of the engine and the engine is warmed up earlier than the transmission, or priority is given to the warm-up of the transmission and the transmission is warmed up earlier than the engine.

Further, depending on the condition during stoppage of the engine, the temperature decreasing condition of the engine may be different from that of the transmission. For example, when the engine temperature is not decreased much but the transmission temperature is decreased, it is preferable that a heat storage tank supplies more coolant to the transmission than to the engine in order to give priority to the warm-up of the transmission.

However, as in the case of the warm-up control device .disclosed in the Japanese Patent Application Laid-Open No. 10-77834, if the ratio between the amount of coolant supplied to the engine and the amount of coolant supplied to the transmission is fixed, the warm-up of the engine or the transmission cannot take priority over the warm-up of the other. Therefore, it is not possible to perform the warm-up operation as required, or according to the temperature conditions of the engine and transmission.

In other words, in the warm-up control devices disclosed in these two publications, the coolant stored in the heat storage device cannot be distributed efficiently to drive devices such as an internal-combustion engine and a transmission as required.

SUMMARY OF THE INVENTION

In view of the above problems, it is hence an object of the invention to provide a warm-up control device for an internal-combustion engine capable of efficiently supplying a heating medium from a heat storage device to an internal-combustion engine and a location requiring temperature rise other than the engine.

In other words, a warm-up control device according to a first aspect of the invention comprises a heat storage device that stores a heating medium heated during operation of the internal-combustion engine, a first path that supplies the heating medium from the heat storage device to the engine, a second path that supplies the heat medium from the heat storage device to a location requiring temperature rise other than the engine main body, a circulation path that allows the heating medium to pass through the engine without passing through the heat storage device, and a controller that selects at least one of the first path, the second path, and the circulation path as a path for supplying the heating medium to at least either of the engine or the location requiring temperature rise according to the temperature rising condition of the engine.

The warm-up control device according to the first aspect of the invention may be constructed such that the heating medium stored in the heat storage device is supplied to the location requiring temperature rise other than the engine through the engine, prior to start of the internal-combustion engine or at the start of the engine, and the heating medium stored in the heat storage device is supplied to the location requiring temperature rise other than the engine, while a condition where the heating medium is circulated in the circulation path is maintained.

Alternatively, the warm-up control device according to the first aspect of the invention may be constructed such that the heating medium stored in the heat storage device is supplied to the engine main body prior to the start of the internal-combustion engine or at the start of the engine, the heating medium is circulated in the circulation.path after the start of the engine, and subsequently part of the circulating heating medium is supplied to the location requiring temperature rise other than the engine without passing through the heat storage device.

An example of the location requiring temperature rise other than the engine may be a drive device having a heat exchanger for exchanging heat between the heating medium passing through the engine main body and a hydraulic fluid.

A warm-up control device according to a second aspect of the invention comprises an internal-combustion engine,land a heat storage device that stores a heating medium heated during operation of the internal-combustion engine. In the warm-up control device, the heating medium stored in the heat storage device is supplied to an internal-combustion engine and a location requiring temperature rise other than the internal-combustion engine. It further comprises a sensor that detects the temperature of the engine and the temperature of the location requiring temperature rise other than the engine, and a setting device that setting the ratio between the amount of the heating medium supplied from the heat storage device to the internal-combustion engine and the amount of the heating medium supplied from the heat storage device to the location requiring temperature rise, according to the detected temperature of the engine and the temperature of the location requiring temperature rise.

According to the second aspect of the invention, it is possible to give priority to either the warm-up of the internal-combustion engine or the warm-up of the transmission, or to perform the warm-up operations in accordance with the respective temperature conditions.

In other words, the setting device sets the ratio between the amount of coolant supplied from the heat storage device to the internal-combustion engine and the amount of coolant supplied from the heat storage device to the transmission such that the amount of the coolant supplied from the heat storage device to the internal-combustion engine is larger than the amount of the coolant supplied to the transmission when the detected engine temperature is a predetermined temperature or lower The warm-up control device according to the second aspect of the invention may be constructed such that the amount of the coolant supplied to the internal-combustion engine is larger than the amount of the coolant supplied to the transmission when the engine temperature is the predetermined temperature or lower. Thus, the internal-combustion engine temperature reaches the predetermined temperature in a short time, and priority is given to the warm-up of the internal-combustion engine. In other words, the warm-up operation is performed with priority given to the engine emission properties and drivability.

The warm-up control device according to the second aspect of the invention may be constructed such that that the amount of the coolant supplied to the transmission is larger than the amount of the coolant supplied to the internal-combustion engine when the engine temperature is the predetermined temperature or higher. Thus, priority is given to the warm-up of the transmission, and the warm-up operation is performed with priority given to the fuel efficiency of the engine when the temperature of the internal-combustion engine is high.

The warm-up control device according to the second aspect of the invention may be.constructed such that priority is given to the warm-up of the transmission, and after the transmission is warmed up to a certain extent, priority is given to the warm-up of the internal-combustion engine. Thus, the transmission is warmed up earlier, and the operation is performed with priority given to the fuel efficiency of the engine.

To the contrary, the warm-up control device may be constructed such that the priority is given to the warm-up of the transmission after the internal-combustion engine is warmed up to a certain extent. Thus, the internal-combustion engine is warmed up earlier, and the operation is performed with priority given to the emission properties and the drivability.

BRIEF DESCRIPTION OF THE DRAWINGS

FIG. 6 is a diagram showing a circulation path for engine coolant in the first embodiment.

DETAILED DESCRIPTION OF THE PREFERRED EMBODIMENTS

Referring now to the accompanying drawings, embodiments of an internal-combustion engine having a heat storage device according to the invention will be described hereinafter.

A first embodiment of the invention will be described with reference to FIG. 1 through FIG. 10.

Figure 1:
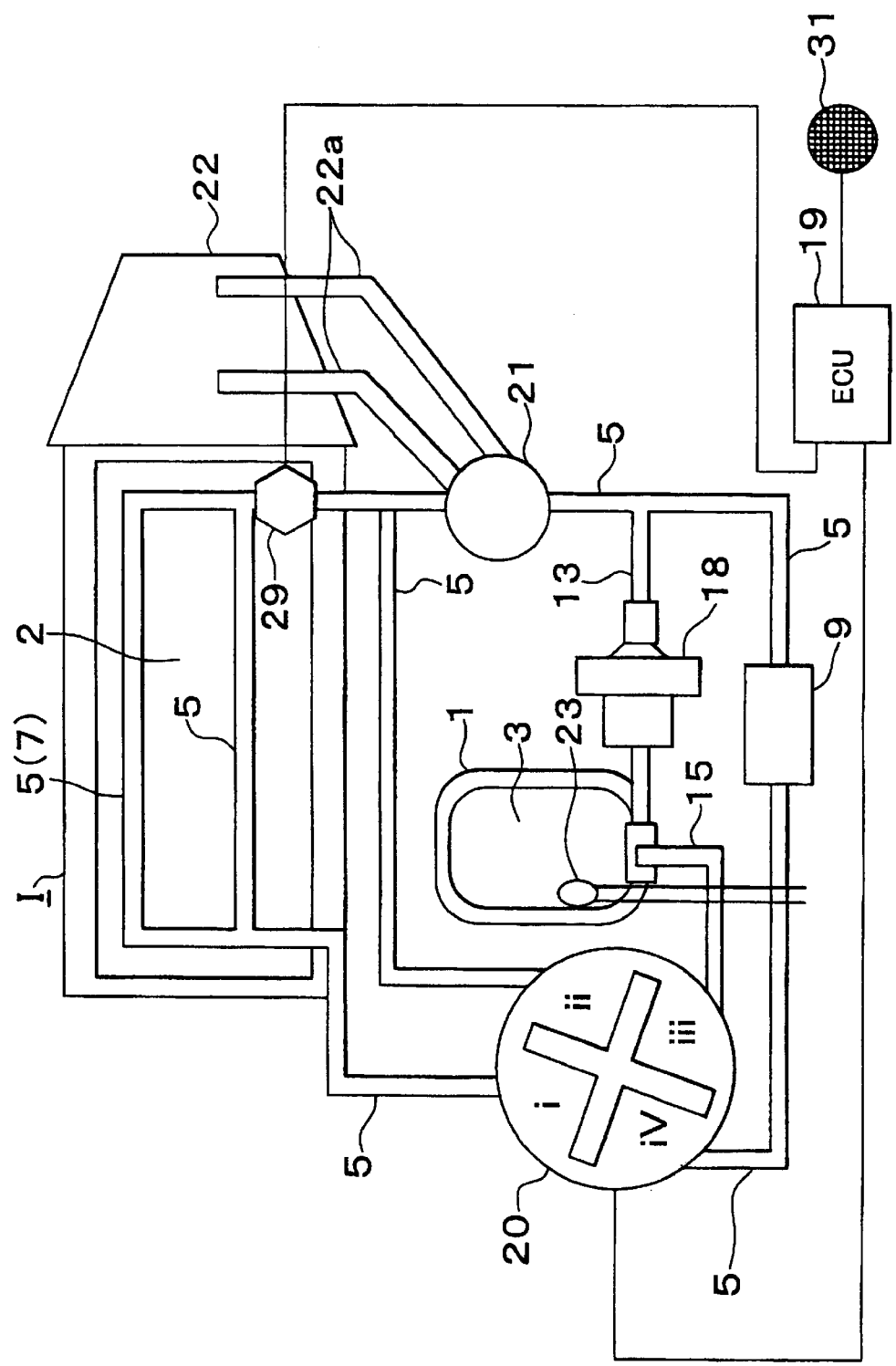
FIG. 1 is a general schematic diagram showing a warm-up control device having a heat storage device according to a first embodiment of the invention.
Figure 2:
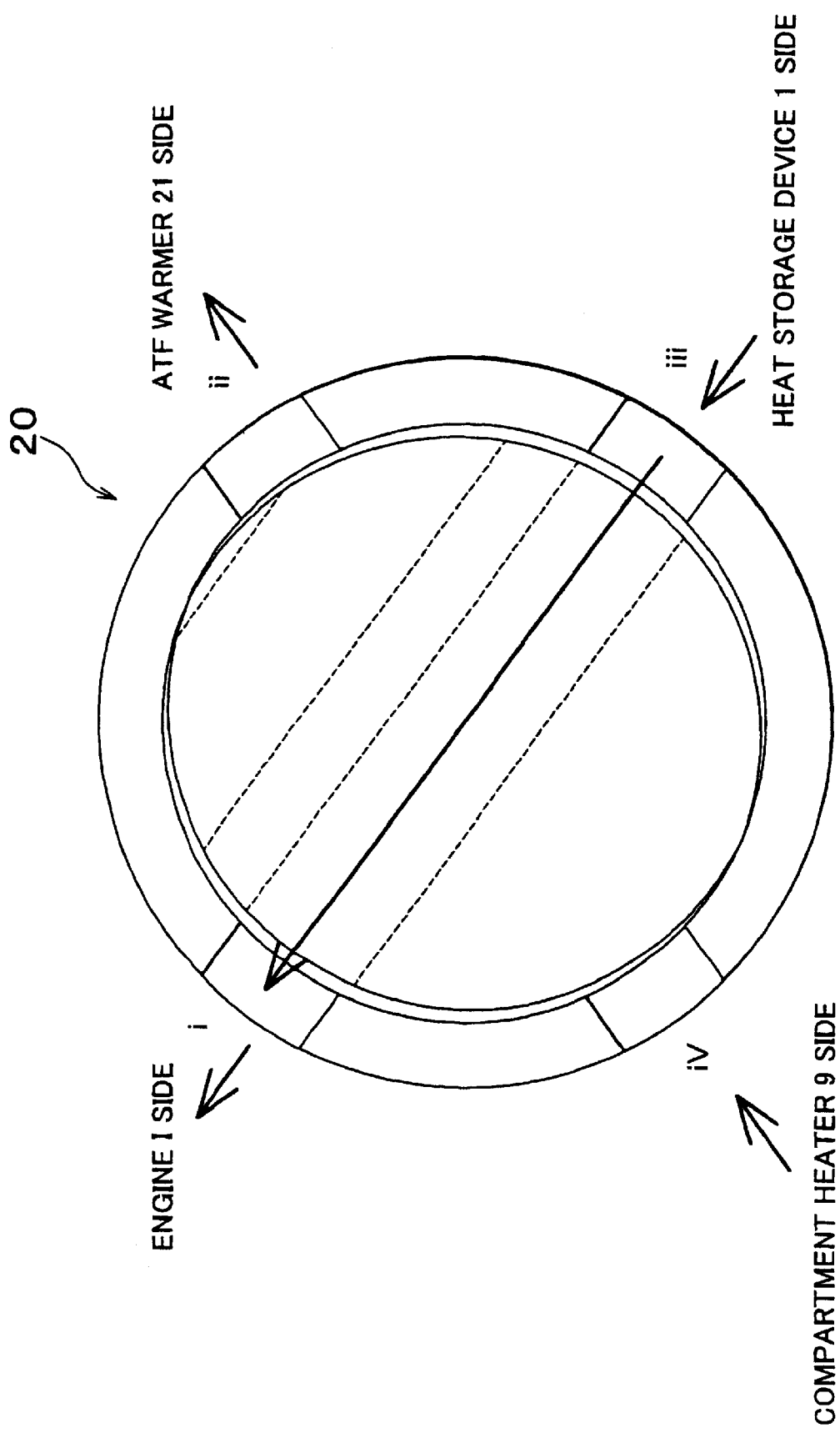
FIG. 2 is a diagram showing a position A of a four-way valve used in the first embodiment.

FIG. 1 is a general schematic diagram of an internal-combustion engine having a heat storage device according to the first embodiment. Engine coolant as a heating medium heated to a high temperature during operation of a gasoline engine I as an internal-combustion engine (hereinafter the coolant is referred to as high temperature coolant) is stored in an heat insulating container 3 as a heat storage device 1. The heat insulating container 3 is composed of a double wall of metal such as stainless steel, and the double wall is vacuum-insulated. As described below, the heat storage device 1 heat-insulates and stores the coolant heated to a high temperature during engine operation, and supplies the heat-insulated and stored coolant to the internal-combustion engine I and a location requiring temperature rise other than the engine, for example, a compartment heater 9 which is a device for heating a compartment, or an ATF warmer 21 (transmission), when the engine temperature is low, for example at the start of the engine.

At the start of the engine, the crankshaft is rotated by engine start support means such as a starter motor attached to an engine main body 2, and a piston is thus performing reciprocating motions in a cylinder. In other words, the engine I is in the so-called cranking condition, and is ready to start operation by itself independently of the starter motor. After the start of the engine, the engine I is operating by.itself independently of the starter motor.

The ATF warmer 21 is a heat exchanger for exchanging heat between the automatic transmission fluid (ATF) which is hydraulic fluid of an automatic transmission (AT) 22, one of drive devices for transmitting power of the engine I to wheels, and the engine coolant, when the temperature of the engine coolant is a predetermined temperature or higher. The ATF warmer 21 belongs to the AT 22. Accordingly, the ATF warmer 21 and the AT 22 communicate with each other through a fluid passage 22a in which the ATF circulates. In the ATF warmer 21 installed on an engine coolant circulation path 5, heat is exchanged between the engine coolant flowing in the engine coolant circulation path 5 and the ATF circulating from the AT 22 to the ATF warmer 21 through the fluid passage 22a, and the temperature of the ATF is increased so that the AT 22 is warmed up earlier. Accordingly, the engine coolant supplied to the ATF warmer 21 is not directly supplied to the AT 22. In other words, the AT 22 is warmed up by exchanging heat between the high temperature coolant and the ATF through the ATF warmer 21 to heat the ATF to a high temperature, and introducing the ATF heated to the high temperature into the AT 22. In other words, the AT 22 is indirectly warmed up by using the high temperature coolant stored in the heat storage devices. In brief, the AT 22 is warmed up and heated by using the high temperature coolant though the high temperature coolant is not directly supplied to it. As mentioned above, the ATF warmer. 21 belongs to the AT 22. Hence, the AT 22 is also a location requiring temperature rise.

Thus, a location to which the engine coolant stored in the heat storage device 1 is not directly supplied, but which is heated to a high temperature by making use of the heat of the engine coolant is also regarded as a location requiring temperature rise.

By the heat carried by the high temperature coolant at the time of supply, the temperature of the location requiring temperature rise is increased even before the start of the engine, that is, even while the engine I is stopped.

Therefore, the heat insulating container 3 is like a thermos bottle. In the heat insulating container 3, a space is provided between an inner and an outer wall so that the temperature of the stored engine coolant may be maintained for a long time, that is, heat can be stored, and this space is vacuumized so that the conduction, convection, and radiation of heat may be minimized.

The inner wall of the heat insulating container 3 is filled with a heat insulating material (not illustrated), and thus a heat storage space is formed in the heat insulating container 3, and the high temperature coolant is stored in this space.

The heat insulating container 3 further comprises an engine coolant supply pipe 13 for supplying the high temperature coolant stored during a previous operation of the engine from the engine coolant circulation path 5, and an engine coolant discharge pipe 15 for discharging the high temperature coolant from the heat insulating container 3 to the engine coolant circulation path 5. The engine coolant supply pipe 13 is provided with a motor-driven water pump 18 for circulating the engine coolant by force in the engine coolant circulation path 5. While the engine I is operating, the motor-driven water pump 18 circulates the engine coolant by assisting an engine mechanical water pump (hereinafter it is referred to as a mechanical W/P, and it is not illustrated), provided in the engine main body 2. However, before the start of the engine I, only the motor-driven water pump 18 is operated to circulate the engine coolant.

In other words, the engine coolant is circulated prior to the start of the engine I or at the start of the engine I by applying the pump pressure of the mechanical W/P and the motor-driven water pump 18. The engine coolant is circulated in the sequence of the heat insulating container 3→the engine coolant discharge pipe 15→a valve device 20 installed on the engine coolant circulation path 5 for selecting the supply destination of engine coolant→a location requiring temperature rise selected by the valve device 20, such as a water jacket 7, a compartment heater 9, or the ATF warmer 21→the engine coolant supply pipe 13→the heat insulating container 3. Even after the start of the engine, the warm-up of the location requiring temperature rise is promoted as required.

The valve device 20 has four openings, a first opening i to a fourth opening iv. The first opening i communicates with the engine coolant circulation path 5 leading to the engine I side, the second opening ii communicates with the engine coolant circulation path 5 leading to the ATF warmer 21 side, the third opening iii communicates with the engine coolant circulation path 5 leading to the heat storage device 1 side, and the fourth opening iv communicates with the engine coolant circulation path 5 leading to the compartment heater 9 side.

Figure 3:
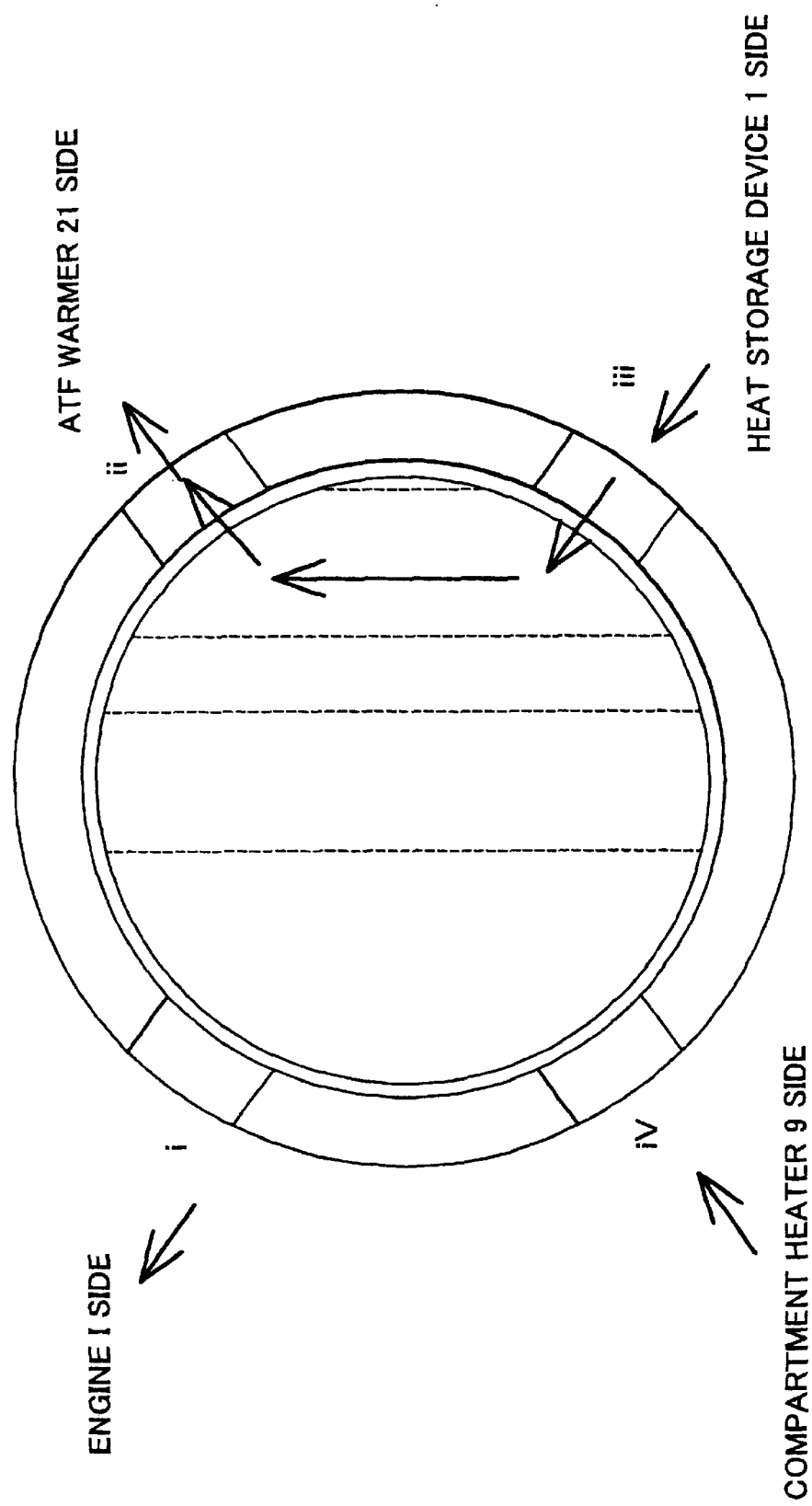
FIG. 3 is a diagram showing a position B of the four-way valve.
Figure 4:
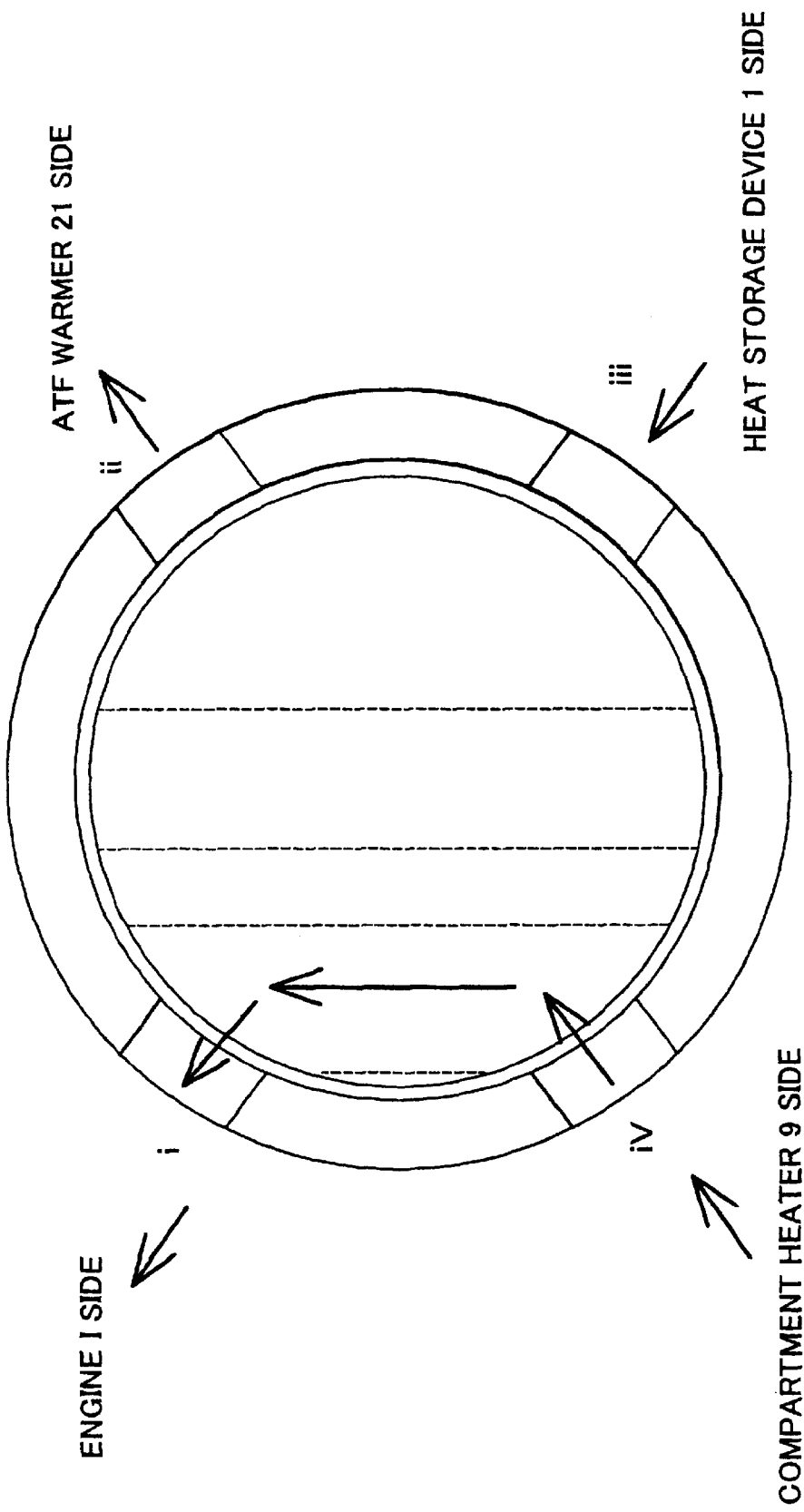
FIG. 4 is a diagram showing a position C of the four-way valve.

The valve device 20 can be appropriately used according to cases, that is, a case A in which the.engine coolant is passed from the third opening iii side leading to the heat storage device 1 only toward the first opening i leading to the engine I side (see FIG. 2), a case B in which the engine coolant is passed from the third opening iii side leading to the heat storage device 1 only toward the second opening ii leading to the ATF warmer 21 side (see FIG. 3), and a case C in which the engine coolant is passed from the fourth opening iv side leading to the compartment heater 9 only toward the first opening i leading to the engine I side (see FIG. 4).

Thus, the valve device 20 has the four openings i to iv in order to select the flow direction of engine coolant. Therefore, it is referred to as a four-way valve 20 hereinafter. In the above case A, case B, and case C, the four-way valve 20 is in a position A, position B, and position C, respectively.

At the outlet of the water jacket, a temperature sensor 29 is provided for detecting the temperature of the engine coolant flowing there. In a cabin, a failure lamp 31 for informing a driver or an occupant of the abnormal condition of the heat storage device 1 having a PTC heater 23 or a battery 24 if the heat storage device 1 is not operating normally. The engine coolant temperature detected by the temperature sensor 29 is referred to as engine outlet water temperature.

The motor-driven water pump 18, the four-way valve 20, the temperature sensor 29, and the failure lamp 31 are connected to an ECU 19 for controlling the entire internal-combustion engine.

The ECU 19 is composed of a digital computer, and comprises the following known elements (not illustrated).

The ECU 19 comprises at least a ROM (read-only memory), a RAM (random access memory), a CPU (microprocessor), an input interface circuit, and an output interface circuit which are mutually connected through a bidirectional bus.

The input interface circuit is electrically connected to instruments such as the temperature sensor 29. Output values from the instruments are input from the input interface circuit to the ECU 19 as electric signals, and the electric signals are temporarily stored in the RAM.

In the ROM, various application programs and maps are stored. When the CPU executes the application programs according to the operating condition of the internal-combustion engine, the appropriate map and output signal are invoked from the ROM and RAM through the bidirectional bus, and are supplied for execution of the application programs. On the basis of the result, various devices such as an injector, the four-way valve 20, and the failure lamp 31 electrically connected to the output interface circuit are started.

The application program for controlling circulation of engine coolant described below is also stored in the ROM.

The flow of the warm-up control using this application program will be described with reference to FIG. 5A and FIG. 5B hereinafter.

Figure 5A:
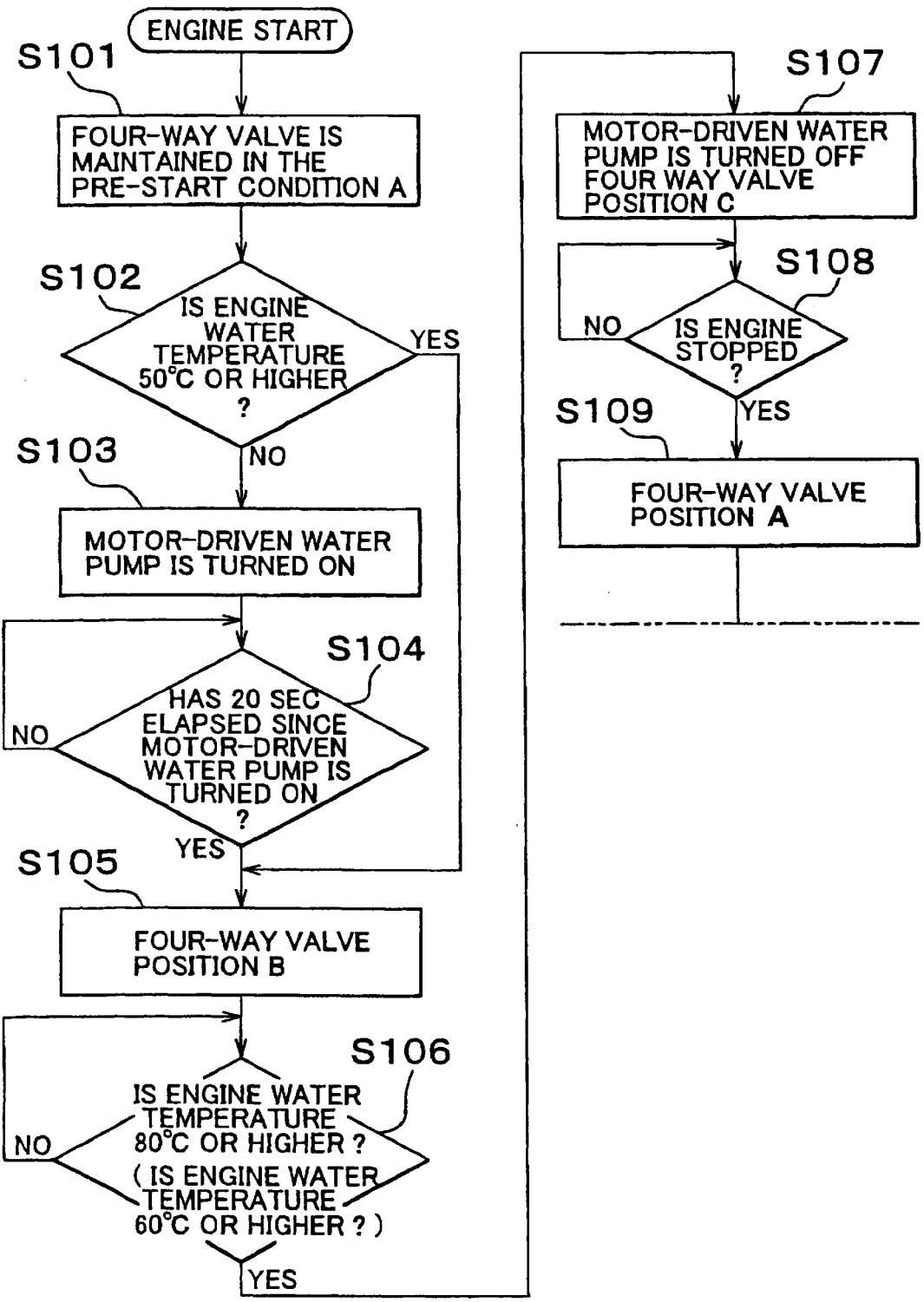
FIGS. 5A and 5B are diagrams showing a warm-up control flow in the first embodiment.
Figure 5B:
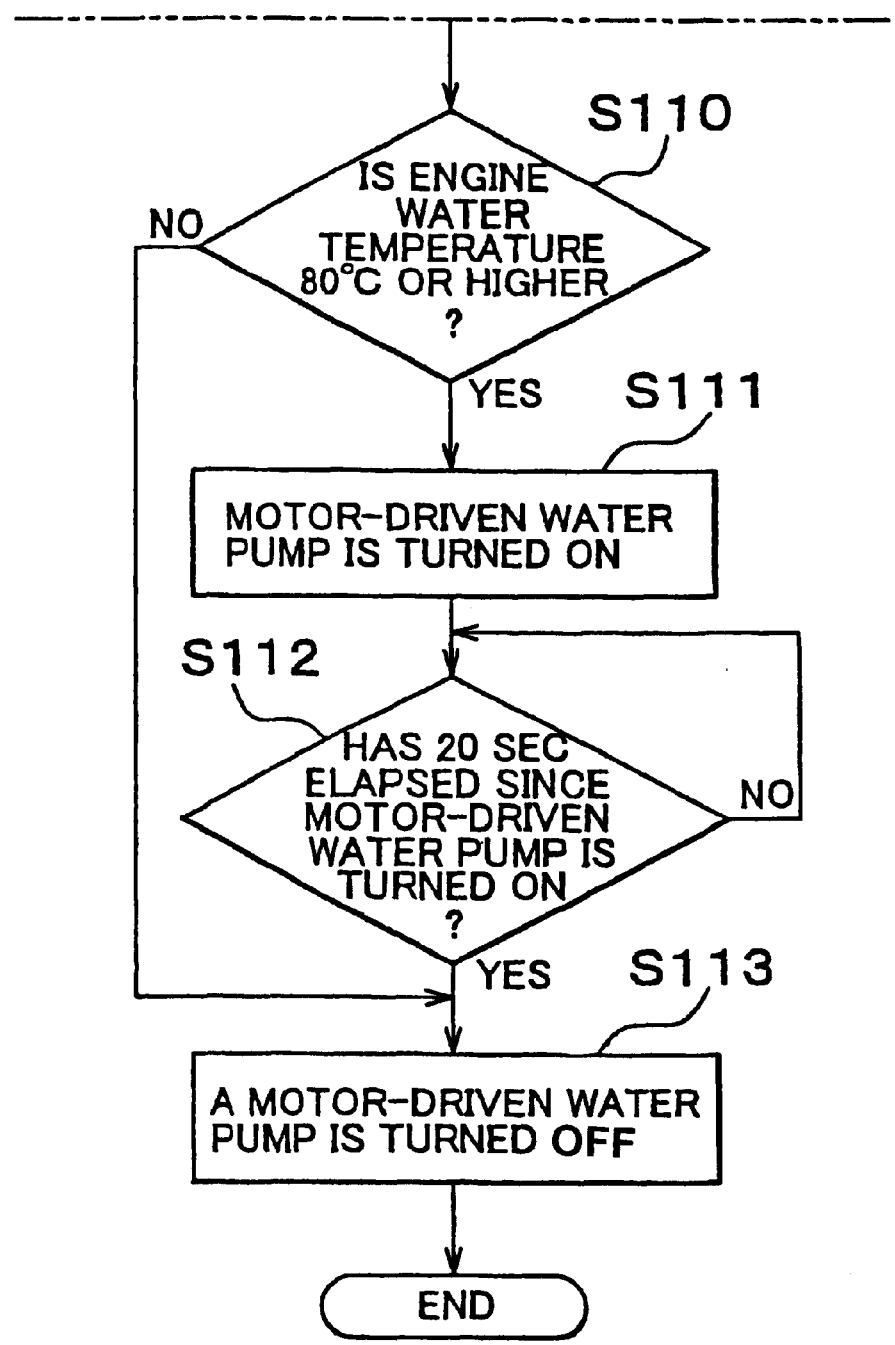
Figure 7:
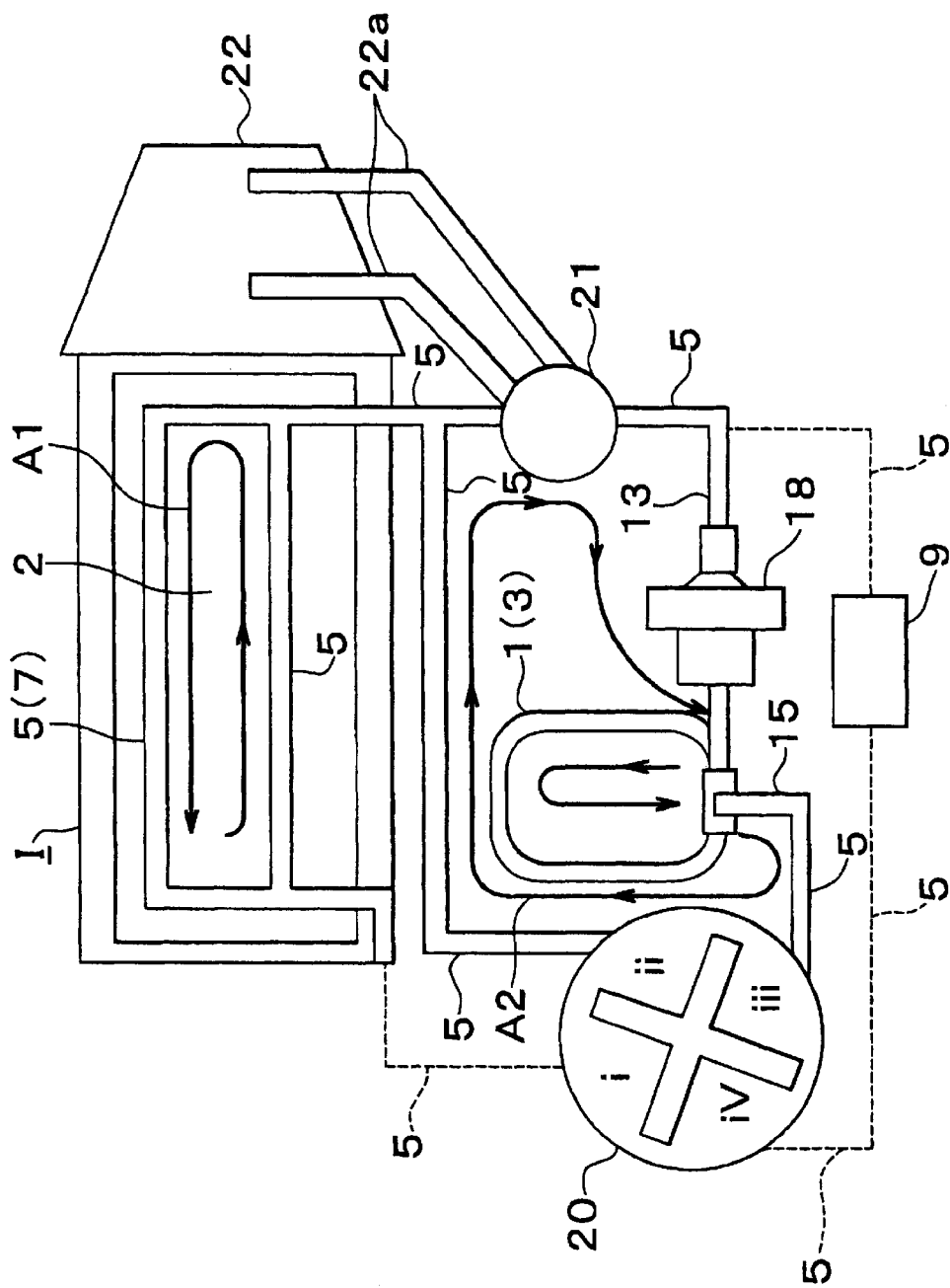
FIG. 7 is a diagram showing another circulation path for engine coolant in the first embodiment.

The warm-up flowcharts shown in FIG. 5A and FIG. 5B are composed of a step 101 to a step 113. The program comprising these steps is stored in the ROM of the ECU 19, and is invoked as required. The processing at each step is all performed by the CPU in the ECU 19.

In FIG. 5A, when the processing shifts to this routine after the start of the engine I, the four-way valve 20 is maintained in the position A (see FIG. 2) which is the condition prior to the start of the engine I, at S101. At this point, as shown in FIG. 6, the engine coolant is circulated in the sequence of the heat insulating container 3→the engine coolant discharge pipe 15→the opening iii of four-way valve 20→the opening i of the four-way valve 20→the water jacket 7→the ATF warmer 21→the engine coolant discharge pipe 13→the heat insulating container 3. FIG. 3 shows the flow of engine coolant when the four-way valve 20 is in the position A to position C, and FIG. 7 and FIG. 8 (described later) show the flow of engine coolant corresponding to the position B and the position C, respectively. In these figures, the portion of the engine coolant circulation path 5 corresponding to each position is shown as a path indicated by a thick solid line with arrows, and other portions of the engine coolant circulation path 5 are shown as paths indicated by dashed lines. The paths indicated by dashed lines are closed. FIG. 6 to FIG. 9 (described later) show the path where the engine coolant flows. In these figures, only main indispensable constituent members are shown.

At S102, the engine outlet water temperature immediately after the start of the engine I is detected by the temperature sensor 29 to judge if it is a predetermined temperature or higher. The predetermined temperature is a temperature effective for realizing early warm-up of, for example, the AT 22. In this embodiment, the predetermined temperature is set at 50° C.

The flow of processing goes to S105 when an affirmative judgement is made at S102, and goes to S103 when a negative judgement is made. At S103, the motor-driven water pump. 18 is turned on. Since the engine I has been started as a precondition, the mechanical W/P is also operating. Therefore, the engine coolant is circulating in the engine coolant circulation path 5. When the motor-driven water pump 18 is turned on and started, the engine coolant stored in the heat insulating container 3 of the heat storage device 1 can be quickly supplied to any one of the locations requiring temperature rise as required.

At S104, it is judged whether a predetermined time has elapsed since the motor-driven water pump 18 is turned on at S103. The predetermined time is a time required for the engine coolant temperature to reach the temperature of 50° C. or higher after the start of the engine I, and is determined based on experience. The predetermined time in this embodiment is 20 sec. The flow of processing goes to S105 when an affirmative judgement is made at S104, and this routine is repeated when a negative-judgement is made.

At S105, the four-way valve 20 is set in the position B (see FIG. 3) so that the engine coolant stored in the heat insulating container 3 may flow from the heat storage device 1 side to the ATF warmer 21 side. At this point, the first opening i of the four-way valve 20 is closed, and the engine coolant circulation path 5 which connects the water jacket 7 with the first opening i of the four-way valve 20 when the four-way valve 20 is in the position A (see FIG. 2) is closed (in FIG. 7, see the engine coolant circulation path 5 indicated by a dashed line connecting the water jacket 7 with the first opening i of the four-way valve 20). Thus, after the start of the engine, the engine coolant is circulated in the path excluding the heat storage device 1 and including the engine main body 2 (see an arrow Al in FIG. 7) in the engine coolant circulation path 5, and this condition is maintained. In other words, after the start of the engine, part of the engine coolant is circulated in the water jacket 7 provided in the engine main body 2 without passing through the heat storage device 1, and this condition is maintained. At the same time, the remaining engine coolant is circulated, as indicated by an arrow A2 in FIG. 7, in the sequence of the heat insulating container of the heat storage device 1→engine coolant discharge pipe 15→the opening iii of the four-way valve 20→the opening ii of four-way valve 20→the ATF warmer 21→the engine coolant supply pipe 13→the heat insulating container 3

Therefore, whether a negative or affirmative judgement is made at S102, the engine coolant is supplied to the ATF warmer 21, and thus early warm-up of the AT 22 can be performed by exchanging heat between the engine coolant and the ATF.

At S106, it is judged if the engine outlet water temperature is another predetermined temperature which is higher than the predetermined temperature, or higher. The predetermined temperature at S106 is a temperature effective for realizing early warm-up of, for example, the compartment heater 9. This predetermined temperature varies depending on the type of the engine. It is set at higher value in a lean-burn engine than in an ordinary gasoline engine. For example, it is preferably 80° C. or higher in the former case, and 60° C. or higher in the latter case. When the engine coolant temperature exceeds this temperature, the warm-up of the internal-combustion engine is completed, and further friction reduction or further improvement of the emission properties of the engine I is no longer expected. This condition is referred to as a predetermined condition in the embodiment.

The flow of processing goes to S107 when an affirmative judgement is made at S106, and this routine is repeated when a negative judgement is made.

Figure 8:
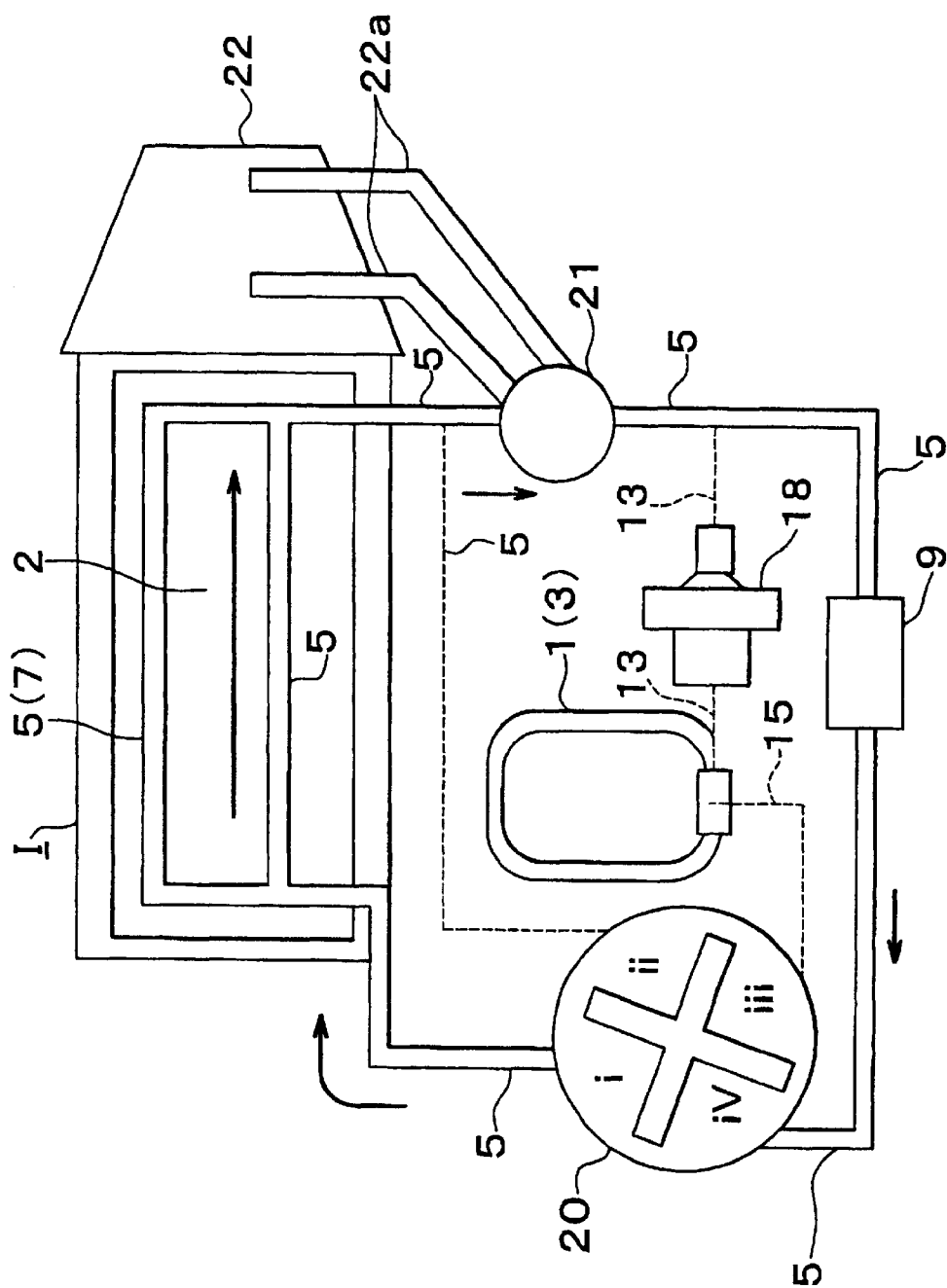
FIG. 8 is a diagram showing a different circulation path for engine coolant in the first embodiment.

At S 107, the motor-driven water pump 18 is turned off, and the four-way valve 20 is set in the position C (see FIG. 4) so that the engine coolant from the water jacket 7 may flow from the compartment heater 9 side toward the engine I side. At this point, the engine coolant is circulated, as shown in FIG. 8, in the sequence of the compartment heater 9→the opening iv of the four-way valve 20→the opening i of the four-way valve 20→the water jacket 7→the ATF warmer 21→the engine coolant supply pipe 5→the compartment heater 9.

There has been described in S105 to S107 regarding the path of flow of engine coolant in the case the four-way valve 20 is in the position B and position C. It is apparent from the description that the engine coolant is circulated in the path excluding the heat storage device 1 and including the engine main body 2 in the engine coolant circulation path 5 after the start of the engine until the engine is place in the predetermined condition, and this condition is maintained. The engine coolant stored in the heat storage device I is supplied to the ATF warmer 21 (AT 22) which is the location requiring temperature rise other than the engine main body.

At next S108, it is judged whether the engine I is stopped or not. The flow of processing goes to S109 if an affirmative judgement is made, and this routine is repeated if a negative judgement is made.

At S109, the four-way valve 20 is set in the position A (see FIG. 2), and the engine coolant stored in the heat insulating container 3 is passed from the heat storage device 1 side to the engine I side.

At S110, it is judged whether the engine outlet water temperature is the above-mentioned predetermined temperature at S106, the step prior to the stoppage of the engine, or higher even when the engine I is stopped. The flow of processing goes to S111 if an affirmative judgement is made, and to S113 if a negative judgement is made.

At S111, the motor-driven water pump 18 is turned on. At this point, since the engine I has been already stopped, the mechanical W/P is stopped (see S108). However, by operating the motor-driven water pump 18, the engine coolant stored in the heat insulating container 3 of the heat storage device 1 can be supplied to the location requiring temperature rise.

At S112, it is judged if a predetermined time has elapsed since the motor-driven water pump 18 is turned on at S111 Herein, the predetermined time is a time required for discharging from the heat insulating container 3 a sufficient amount of the high temperature coolant stored in the heat insulating container 3 of the heat storage device 1 for warming up the engine effectively. After the discharge is completed, the engine coolant flows into the heat insulating container 3 from the engine coolant circulation path 5.

The flow of processing goes to S113 if an affirmative judgement is made at S112, and this routine is repeated if a negative judgement is made.

At S113, the motor-driven water pump 18 is turned off, and the sequence of the operations is completed.

Figure 9:
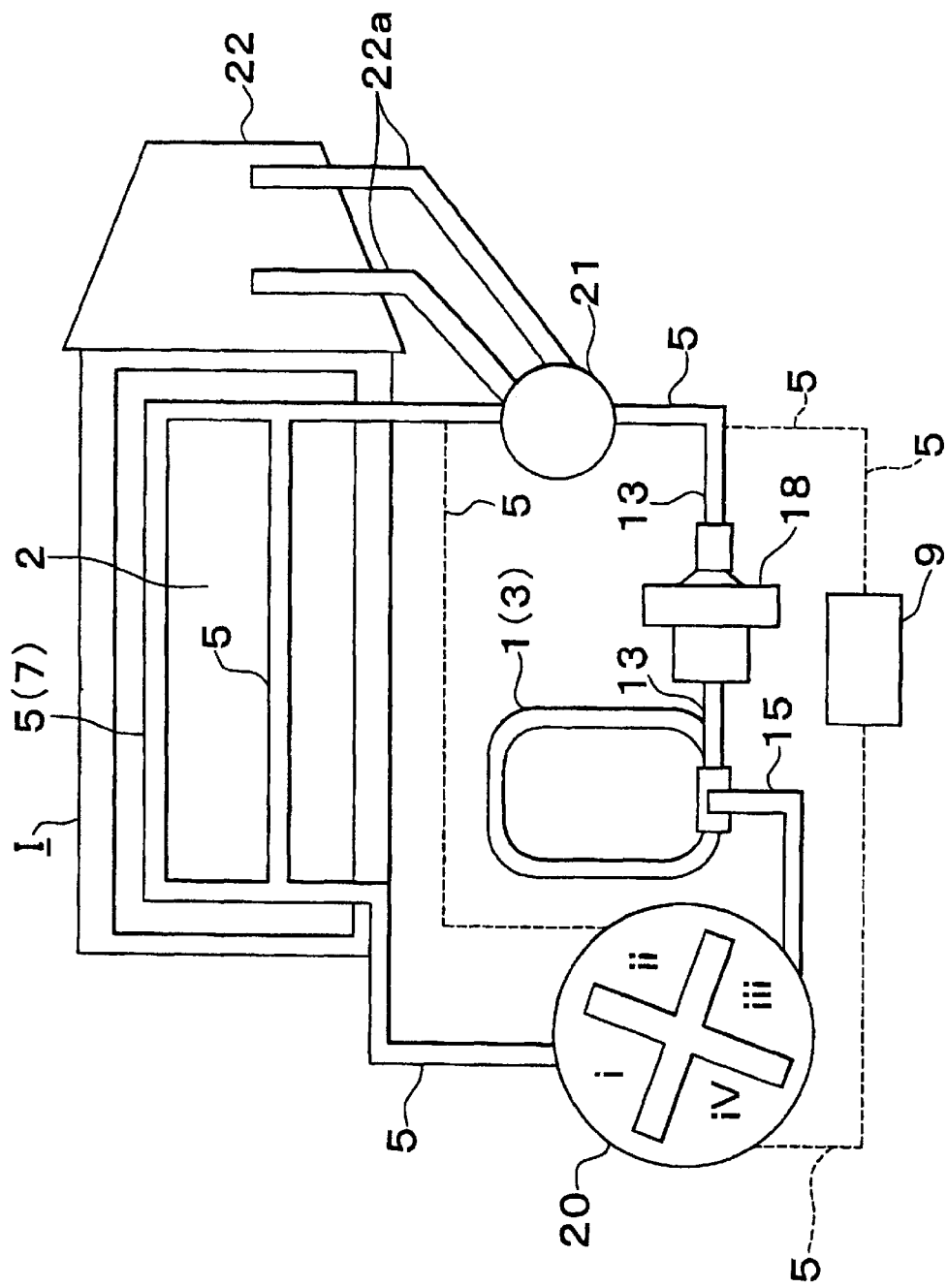
FIG. 9 is a diagram showing the condition in preparation for next circulation after returning to the condition shown in FIG. 6.

At this point, the four-way valve 20 is maintained in the position A, and its position is adjusted prior to next circulation of the engine coolant (see FIG. 9).

Next, the action and effect of the first embodiment will be described.

According.to the engine I in the embodiment, the engine coolant stored in the heat insulating container 3 of the heat storage device 1 is supplied to the ATF warmer 21 of the AT 22 which is the location requiring temperature rise other than the engine main body 2 through the water jacket 7 prior to the start of the engine or at the start of the engine. Therefore, if the stored engine coolant is in the high temperature condition, early warm-up can be performed only by supplying this high temperature coolant to a location requiring temperature rise other than the engine main body 2.

After the start of the engine, the engine coolant is circulated in the path excluding the heat storage device 1 and including the water jacket 7 belonging to the engine main body in the engine coolant circulation path 5, and this condition is maintained. At the same time, the engine coolant stored in the heat insulating container 3 of the heat storage device 1 is supplied to the ATF warmer 21 (AT 22) which is the location requiring temperature rise other than the engine main body. In other words, the engine coolant is circulated in the water jacket 7 in the engine main body 2 without passing through the heat storage device 1, and this condition is maintained until the engine is placed in the predetermined condition after the start of the engine. At the same time, the engine coolant stored in the.heat insulating container 3 of the heat storage device 1 is supplied to the ATF warmer 21 (AT 22) which is the location requiring temperature rise other than the engine main body 2 (see FIG. 7 and FIG. 8). Accordingly, the engine coolant is divided into engine coolant A1 for warming up only the water jacket 7, and engine coolant A2 stored in the heat storage device 1 for warming up a location requiring temperature rise other than the water jacket 7. Therefore, the engine coolant A1 for warming up only the water jacket 7 is not deprived of heat by other elements, and the heat loss becomes smaller for.this reason. Thus, the engine warm-up can be promoted effectively. On the, other hand, since the engine coolant A2 is stored in the heat insulating container 3 of the heat storage device 1, the heat exchange in the ATF warmer 21 is promoted, if the stored engine.coolant temperature is high. Thus, the warm-up of the. AT 22 communicating with the ATF warmer 21 through the fluid passage 22a can be promoted.

Therefore, early warm-up of the engine main body 2 and the drive device is promoted, and the emission can be reduced effectively.

In the first embodiment, the gasoline engine is shown as an example of the internal-combustion engine. However, a diesel engine or other lean-burn engines may be employed.

A warm-up control device according to the second embodiment will be described with reference to FIG. 10 to FIG. 14.

The warm-up control device in the second embodiment differs from the first embodiment in the following points.

In the warm-up control device having an internal-combustion engine in the first embodiment, the engine coolant is circulated in the path excluding the heat storage device 1 and including the engine main body 2 (see the path indicated by a thick dashed line in FIG. 10) in the engine coolant circulation path 5, and this condition is maintained. At the same time, the heating medium stored in the heat storage device is supplied to the location requiring temperature rise other than the engine main body 2, such as the AT 22. By contrast, in the warm-up control device having the internal-combustion engine in the second embodiment the heating medium is circulated in the path excluding the heat storage device and including the engine main body after the start of the engine, and then part of the circulating engine coolant is supplied to a location requiring temperature rise other than the engine main body 22 without passing through the heat storage device.

As a structural difference, a case in which a diesel engine is employed as the internal-combustion engine in the second embodiment will be described. In FIG. 10 to FIG. 14, a combustion type heater 32 and an EGR cooler 35 used for warming up an engine are shown.

Further, instead of the four-way valve 20 in the first embodiment, a path changeover valve 20A is provided. The path changeover valve 20A is a three-way valve having openings (1) to (3), and an appropriate opening is opened or closed as required.

Moreover, as shown in FIG. 10 to FIG. 14, in the path for a heating medium, there are provided an engine oil cooler 33, a flow rate control valve (an electronic thermostat) 37, a mechanical W/P 39, and a radiator 41.

Figure 10:
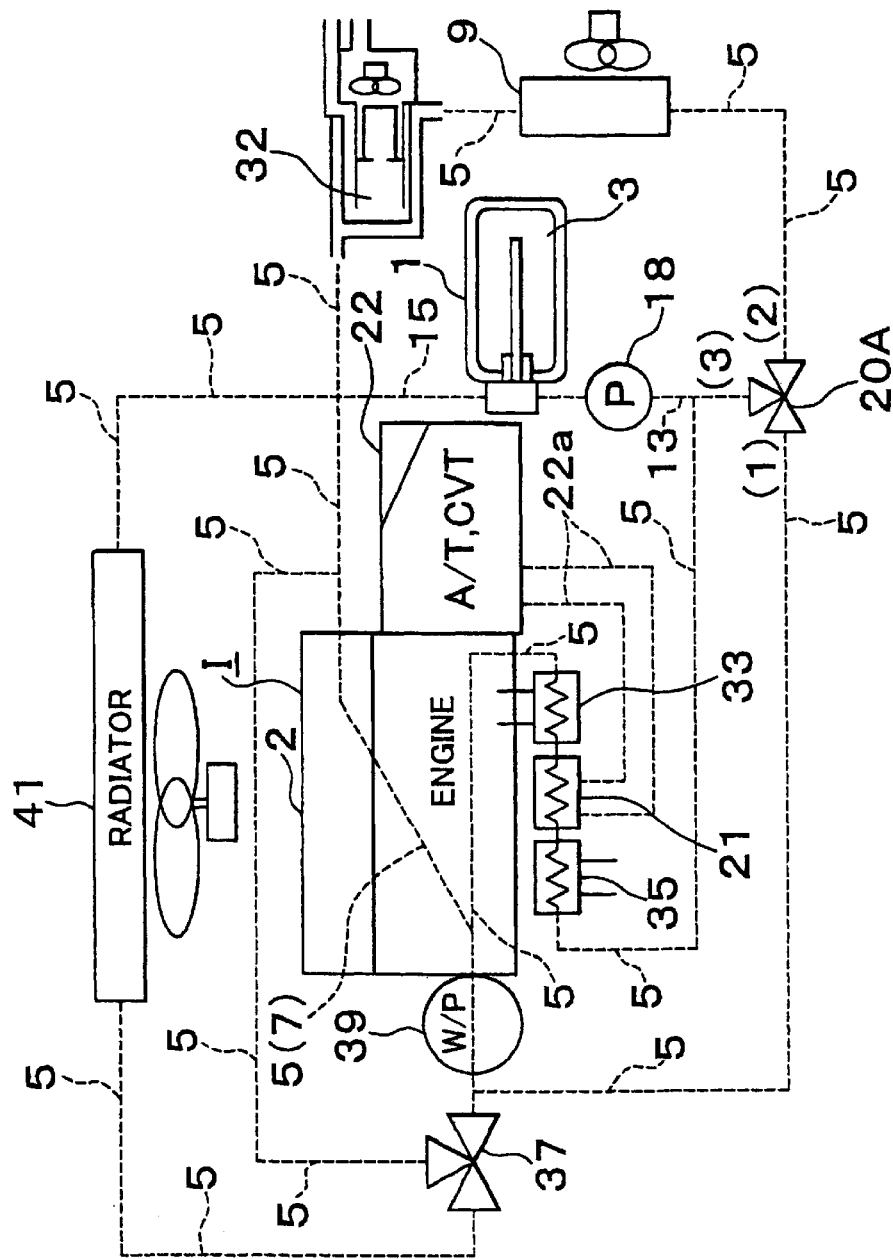
FIG. 10 is a general schematic diagram showing a warm-up control device according to a second embodiment of the invention.

FIG. 10 is a general schematic diagram showing a warm-up control device having an internal-combustion engine according to this embodiment. As shown in FIG. 10, engine coolant (hereinafter it is referred to as "high temperature coolant") as a heating medium heated to a high temperature during operation of a diesel engine I is stored in a heat insulating container 3 as a heat storage device 1. Prior to the start of the engine I or at the start of the engine I, the high temperature coolant is returned to an engine coolant circulation path 5 as a heating medium circulation path from the heat insulating container 3 through an engine coolant discharge pipe 15, and then, the engine coolant is also supplied to a location requiring temperature rise other than the engine such as a compartment heater 9 or an ATF warmer 21 of an AT 22 through a water jacket 7 formed in the main body 2 of the engine I.

In the diesel engine I, even if it is stopped, by supplying the engine coolant to the location requiring temperature rise, the temperature of the location requiring temperature rise is increased by the heat carried by the high temperature coolant at that time.

The action and effect of the device having such a configuration according to the second embodiment will be described with reference to FIG. 11 to FIG. 14. In these figures, the portion indicated by a thick solid line with arrows in the engine coolant circulation path 5 shows the path for engine coolant in each case as described below.

Figure 11:
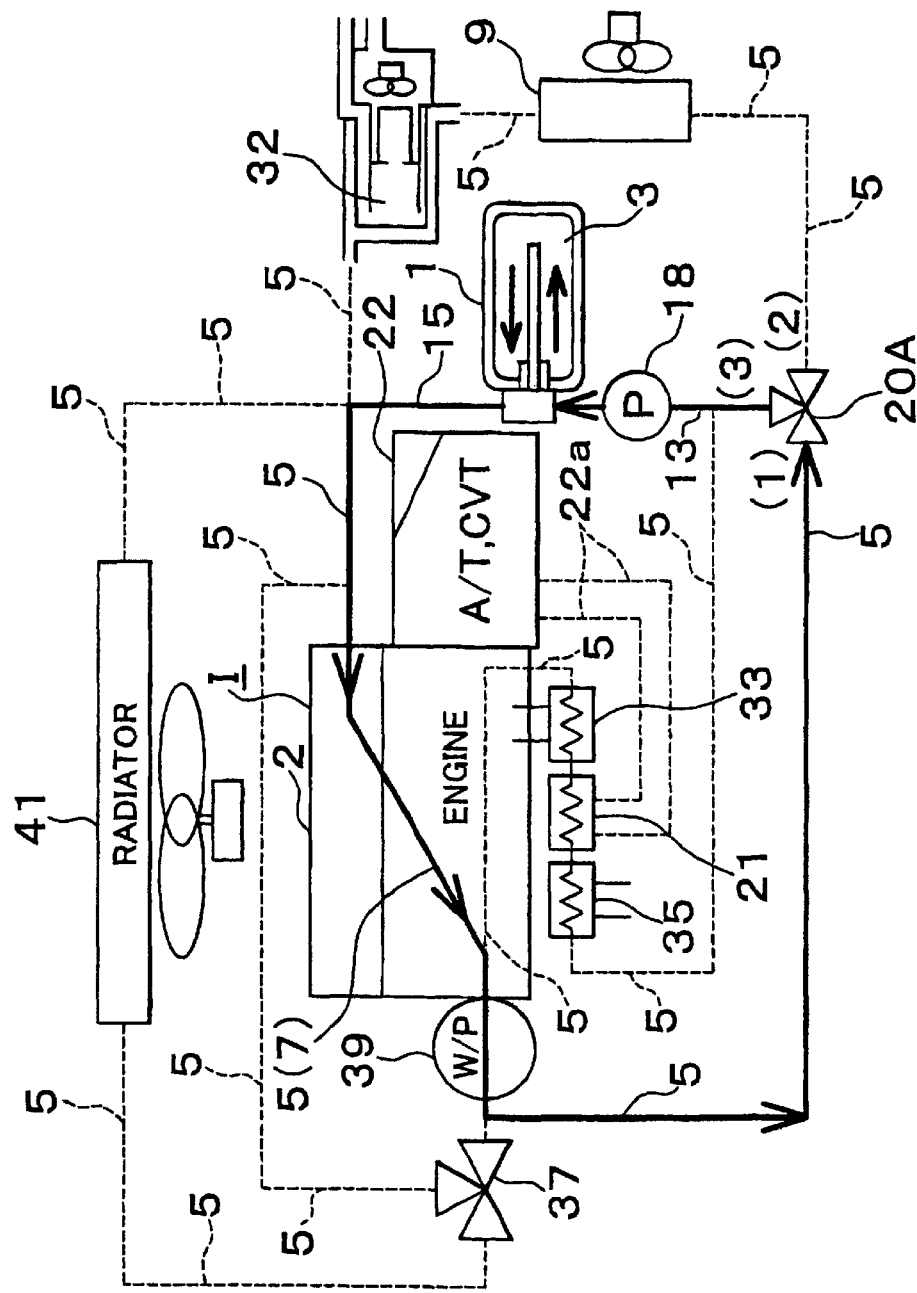
FIG. 11 is a diagram showing a.circulation path for engine coolant in the second embodiment.

FIG. 11 shows a path for engine coolant in the case where warm-up before the start of the engine I or at the start of the engine I, that is, the so-called momentary warm-up is performed. Specifically, it shows a circulation path in the case where the engine coolant is circulated before the engine I begins its operation by itself. In this case, the openings (1) and (3) of the path changeover valve 20A are opened, and the both communicate with each other, while the opening (2) is closed. Accordingly, a the opening (2) does not communicate with the openings (1) and (3). In this condition, the motor-driven water pump 18 is operated. As a result, the high temperature coolant stored in the heat insulating container 3 of the heat storage device 1 before the start of the engine (immediately before the start of the engine) or at the start of the engine is sent into the water jacket 7 formed in the engine main body 2. Subsequently, the engine coolant stored in the water jacket 7 is replaced with high temperature coolant of the heat storage device 1, then the motor-driven water pump 18 is stopped, and the engine coolant is enclosed in the engine. In other words, by the heat carried by the high temperature coolant, the water jacket 7, that is, the location requiring temperature rise is directly warmed up, and the temperature of the water jacket 7 is increased. The time required for changing the engine coolant circulation path is previously determined based on experience or the like. The flow of engine coolant in this case will be described with reference to the thick solid line with arrows. The engine coolant is circulated in the sequence of the heat insulating container 3 of the heat storage device 1 which is the supply source of the engine coolant the engine coolant discharge pipe 15→the engine coolant circulation path 5→the water jacket 7→the mechanical W/P 39→the engine coolant circulation path 5 the opening (1) of path changeover valve 20A,→the opening. (3) of path changeover valve 20A→the engine coolant supply pipe 13→the heat insulating container 3.

Figure 12:
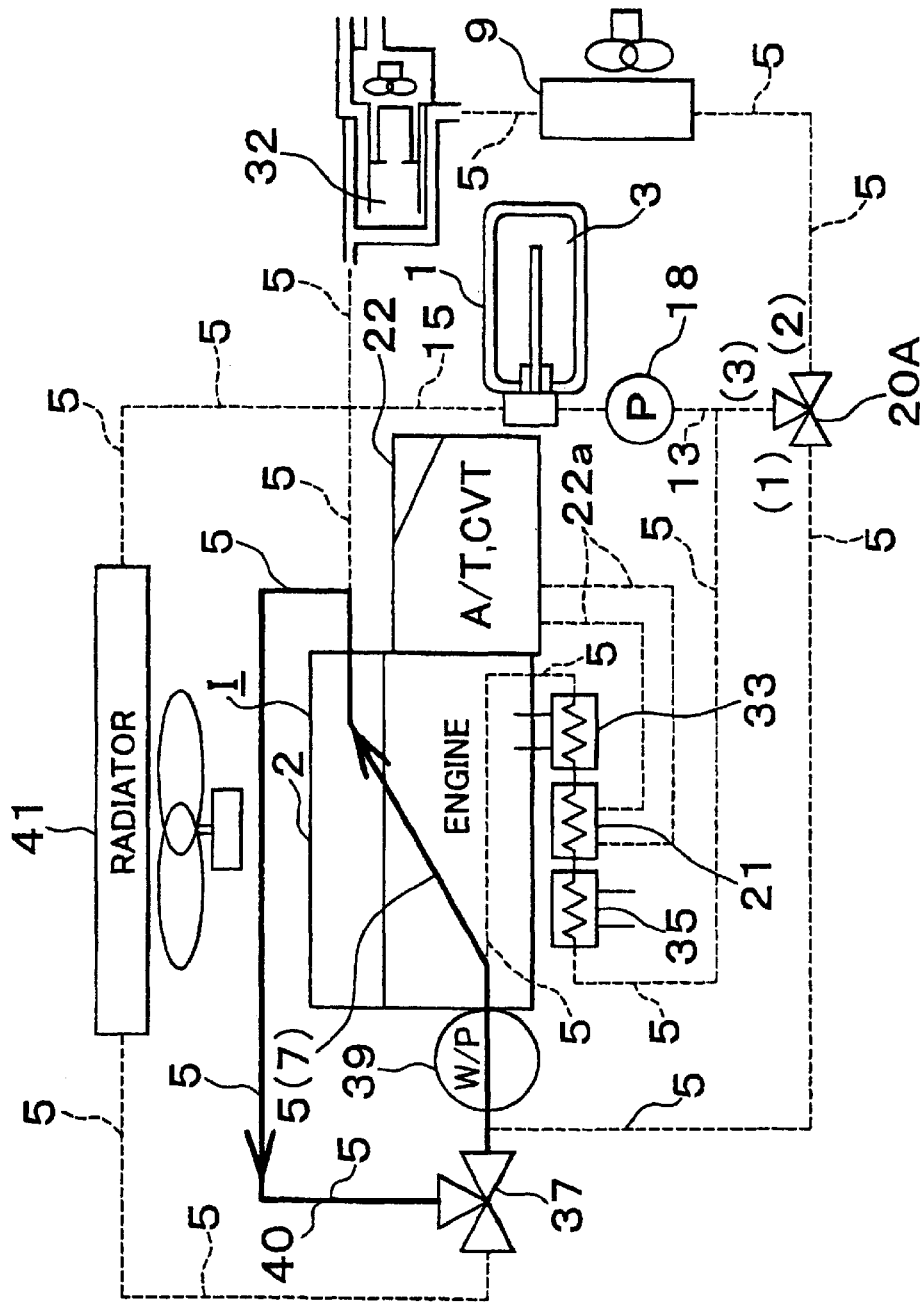
FIG. 12 is a diagram showing another circulation path for engine coolant in the second embodiment.

FIG. 12 is a diagram showing a case where a rapid warm-up is performed immediately after the start of the engine. All the openings (1), (2) (3) of the path changeover valve 20A are in the non-communicating condition, and the motor-driven water pump 18 is not in operation. Thus, the engine coolant hitherto flowing in the route in FIG. 11 does not pass through the heat insulating container 3 of the heat storage device 1, and circulates only through the engine main body 2, that is, the water jacket 7. In other words, the heating medium circulates in the path excluding the heat storage device 1 and including the engine main body 2. The flow of engine coolant in this case is indicated by an arrow 40. The engine coolant circulates in the sequence of the water jacket 7→the engine coolant circulation path 5→the flow rate control valve 37→the engine coolant circulation path 5→the mechanical W/P 39→the water jacket 7.

Circulation of engine coolant in this path 40 continues until the engine I is placed in a predetermined condition after the start of the engine I. The predetermined condition is a condition where the engine coolant temperature is increased to such an extent as further friction reduction or further improvement of the emission properties of the engine I is no longer expected. This condition varies depending on the type or displacement of the engine. For example, it is the condition where the engine coolant temperature becomes 60° C. or higher.

At this point, the engine coolant in the heat insulating container 3 of the heat storage device remains stored in the heat insulating container 3.

Figure 13:
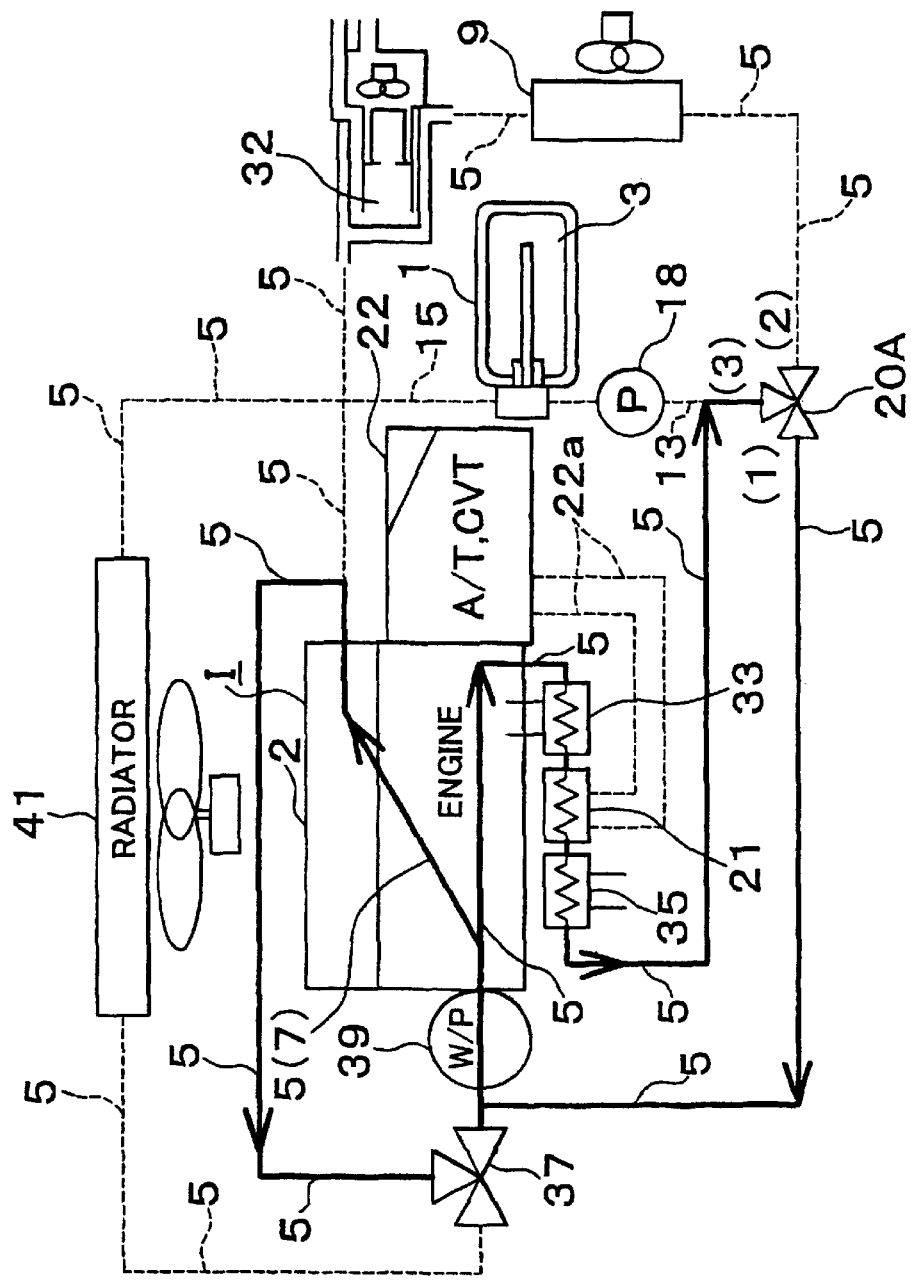
FIG. 13 is a diagram showing a different circulation path for engine coolant in the second embodiment.

FIG. 13 is a diagram showing a case where part of the engine coolant in the water jacket 7 is passed also to the ATF warmer 21, an engine oil cooler 33, and an EGR cooler 35 when the engine coolant temperature exceeds the predetermined temperature. At this point, however, the engine coolant is not passed to the heat storage device 1 yet.

More specifically, when the engine is placed in the predetermined condition after the start of the engine, the openings (1) and (3) of the path changeover valve 20A are opened to communicate with each other, while the opening (2) is in the non-communicating condition. At this point, the motor-driven water pump 18 is not in operation. Thus, part of the engine coolant hitherto flowing only in the path 40 shown in FIG. 13 flows out of the path 40, receives the pump pressure of the mechanical W/P 39, and begins to circulate also in the sequence of the path 40→the engine coolant circulation path 5→the engine oil cooler 33 ATF warmer 21 the EGR cooler 35→the engine coolant circulation path 5→the opening (3) of the path changeover valve 20A→the opening (1)→the engine coolant circulation path 5→the path 40.

In other words, after the start of the engine, the engine coolant is circulated in the path 40 excluding the heat storage device 1 and including the engine main body 2 (the water jacket 7), and after the engine is placed in the predetermined condition, part of the engine coolant circulating in the path 40 is supplied to the location requiring temperature rise other than the engine main body 2 such as the AT 22 without passing through the heat storage device 1. At this point, therefore, the engine coolant replacing the previous engine coolant during the momentary warm-up shown in FIG. 11 remains stored in the heat insulating container 3 the heat storage device 1.

Figure 14:
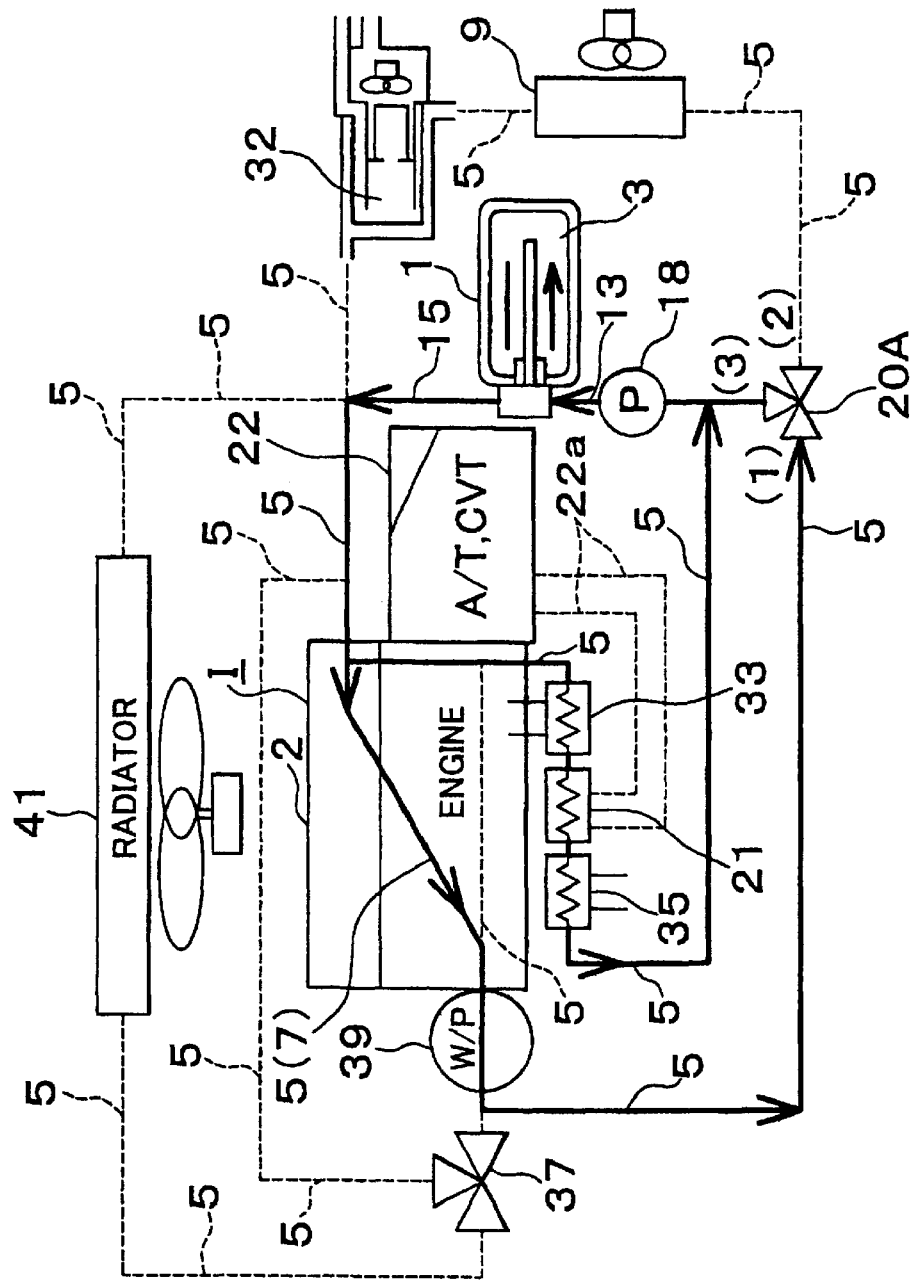
FIG. 14 is a diagram showing a further different circulation path for engine coolant in the second embodiment.

FIG. 14 is a diagram showing a case where the engine coolant is supplied, and waste heat is recovered (heat is stored) in the heat storage device 1. After the warm-up of the engine I, the high temperature coolant is supplied from the water jacket 7 to the heat insulating container 3 of the heat storage device 1 through the motor-driven water pump 18 by opening the openings (1), (3) of the path changeover valve 20A such that they communicate with each other. At this point, the path for supplying the engine coolant to the heat insulating container 3 of the heat storage device 1 is not limited to a specific path, provided that the coolant passes through the water jacket 7.

In the device having such a configuration according to the second embodiment, the engine coolant as a heating medium stored in the heat storage device 1 is supplied to the engine main body 2 prior to the start of the internal-combustion engine I or at the start of the engine. Therefore, when the stored engine coolant is in a high temperature condition, early warm-up can be performed only by supplying the high temperature coolant to the engine main body 2.

In addition, the engine coolant circulates in the path 40 excluding the heat storage device 1 and including the engine main body 2 after the start of engine. In other words, the engine coolant circulates through the engine main body 2 exclusively without passing through the heat storage device 1 until the internal-combustion engine I is placed in the predetermined condition. Therefore, the heat of the engine coolant is supplied to the engine main body 2 in a concentrated manner. Therefore, the heat loss becomes smaller because the engine coolant does not pass through the heat storage device 1. Thus, the engine coolant is not deprived of heat by the heat storage device 1, and the warm-up of the engine is promoted.

Further, after the engine coolant circulates in the path 40, and more specifically, after the internal-combustion engine I is placed in the predetermined condition, part of the engine coolant circulating in the engine main body 2 is supplied to the location requiring temperature rise other than the engine main body 2, such as the AT 22, without passing through the heat storage device 1. The heat loss becomes smaller because the engine coolant does not pass through the heat storage device. Thus, the warm-up of the location requiring temperature rise other than the engine main body 2 may be also promoted.

Accordingly, as compared with the case where the engine coolant passes through the heat storage device 1, the heat loss is smaller, and the early warm-up is promoted in this case. At the same time, the emission can be decreased effectively.

The drive device described in each embodiment is the AT 22. However, needless to say, other drive devices such as a continuously variable transmission (CVT), a transfer device for distributing power from a transmission to front and rear wheels used in a four-wheel drive car and the like may be employed.

As the hydraulic fluid in the drive device, lubricating oil for preventing power loss and metal abrasion in a drive device, and control fluid used in a torque converter of an automatic transmission may be employed. In addition, the engine other than the diesel engine, for example, a lean-burn engine may be employed.

Hereinafter, the third embodiment of the invention will be described with reference to FIG. 15 to FIG. 20.

Figure 15:
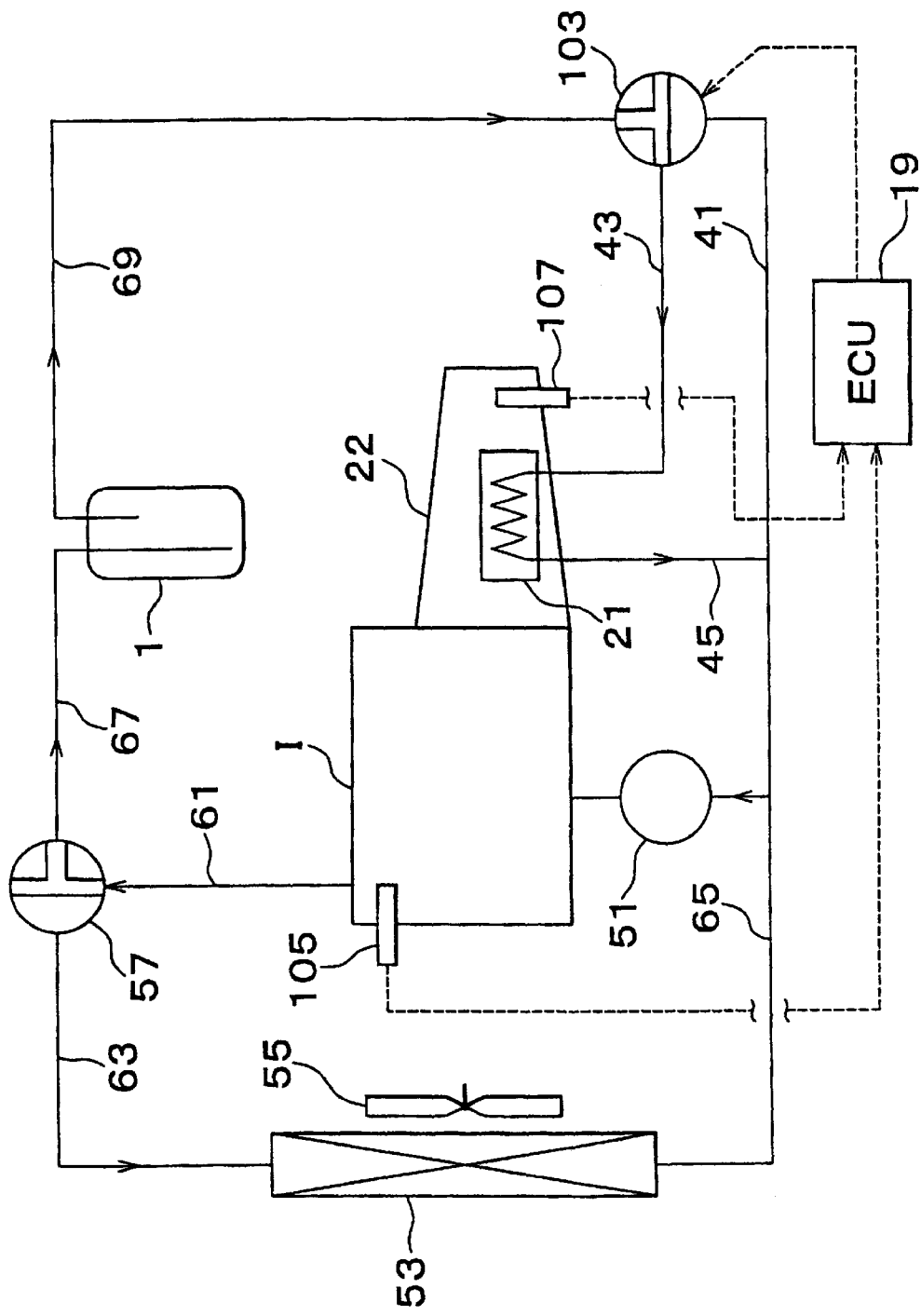
FIG. 15 is a general schematic diagram showing a warm-up control device according to a third embodiment of the invention.

FIG. 15 is a general schematic diagram showing a warm-up control device according to one embodiment in which the invention is applied to an automotive internal-combustion engine and a transmission.

As shown in FIG. 15, the warm-up control device comprises an automotive internal-combustion engine I, an automatic transmission 22 connected to the output shaft of the internal-combustion engine I, a radiator 53 for cooling the coolant of the internal-combustion engine I, a radiator fan 55, and a coolant pump 51 for circulating the coolant.

In the third embodiment, a heat storage device is connected to the coolant outlet side of the internal-combustion engine I through a thermostat 57.

In the coolant system of the internal-combustion engine of embodiment 3, a warm-up system is provided in addition to the ordinary coolant system. In the ordinary coolant system, the engine coolant flows from the coolant pipe 61 connected to the coolant outlet of the internal-combustion engine I, and passes through the thermostat 57, a pipe 63, a radiator 53, and a pipe 65. Then, it flows from the coolant pump 51 into the internal-combustion engine.

In the warm-up system, the engine coolant flows from the pipe 61, and passes through the thermostat 5, a pipe 67, a heat storage device 1, and a pipe 69. The flow of the coolant passing through the pipe 69 is switched by a three-way valve 103 between a flow toward the transmission 22, and a flow toward the internal-combustion engine I through the pipe 41. The flow toward the transmission 22 runs from the pipe 69, and passes through a pipe 43, an ATF warmer 21 (a heat exchanger for the transmission) provided in the oil pan of a transmission 22, and is sucked into the coolant pump 51 from the pipe 45. The ATF warmer 21 heats the fluid by exchange heat between the warm coolant supplied from the heat storage device 1 and the transmission fluid in the oil pan. It is an ordinary fin tube type heat exchanger.

An ECU 19 performs the warm-up control when the engine temperature is low in this embodiment as mentioned below, in addition to the basic control such as fuel injection control of the engine. For this purpose, the input port of the ECU 19 receives a voltage signal corresponding to the temperature of the coolant flowing in the coolant jacket of the engine I from a coolant temperature sensor 105 disposed in the coolant jacket of the internal-combustion engine I, and a voltage signal corresponding to the temperature of the transmission fluid in the transmission oil pan from a fluid temperature sensor 107 disposed in the oil tank (oil pan) of the transmission 22.

The output port of the ECU 19 is connected to the actuator (not shown) of the three-way valve 103 provided in the coolant warm-up system, and controls the changeover position of the three-way valve 103.

In this embodiment, the ECU 19 can switch the position of the three-way valve 103 between two positions, that is, the position for guiding the warm coolant from the pipe 69 into the heat exchanger 21 through the pipe 43 (it is referred to as "a transmission warm-up position" hereinafter), and the position for guiding the warm coolant from the pipe 69 directly to the coolant pump 51 through the pipe 41 (it is referred to as "an engine warm-up position hereinafter).

The thermostat 57 provided at the coolant outlet pipe of the engine I functions as an automatic changeover valve for guiding the coolant flowing in the pipe 61 to the pipe 63 leading to the radiator 53, and to the pipe 67 leading to the heat storage device 1, according to the coolant temperature. In other words, when the coolant temperature at the outlet of the engine I is lower than a predetermined value at the start of the engine, or other occasions, the thermostat 57 allows the whole amount of coolant in the pipe 61 to flow into the pipe 67 side. Thus, the warm coolant stored in the heat storage device 1 is discharged into the pipe 69, and the coolant circulates only through the warm-up system. When the warm-up of the engine is completed and the coolant temperature is sufficiently increased, the thermostat allows part of the coolant in the pipe 61 to flow to the pipe 67 side, and the remainder to flow to the radiator 53 side through the pipe 63. Thus, most part of the coolant flows in the coolant system passing through the radiator 53, and the engine I is cooled sufficiently. At the same time, part of the coolant at a high temperature is constantly circulating through the pipe 67 and the heat storage device 1. Therefore when the engine is stopped, the coolant at high temperature is heat-insulated and stored in the heat storage device 1.

In the third embodiment, the ECU 19 controls the warm-up of the engine I and transmission 22 by switching the three-way valve 103 on the basis of engine coolant temperature TW detected by the coolant temperature sensor 105 when the engine temperature is low.

In the third embodiment, the warm-up operation is performed with priority given to the emission properties of the engine I and the drivability. In other words, in the third embodiment, the engine coolant temperature TW is used as a parameter representing the engine temperature. When the engine coolant temperature TW is a predetermined value or lower, the warm coolant from the heat storage device 1 is supplied only to the engine I, and the warm-up of the engine I is promoted. Thus, even when the engine temperature is low at the start of the engine, the emission properties and drivability are improved in a short time.

Figure 16:
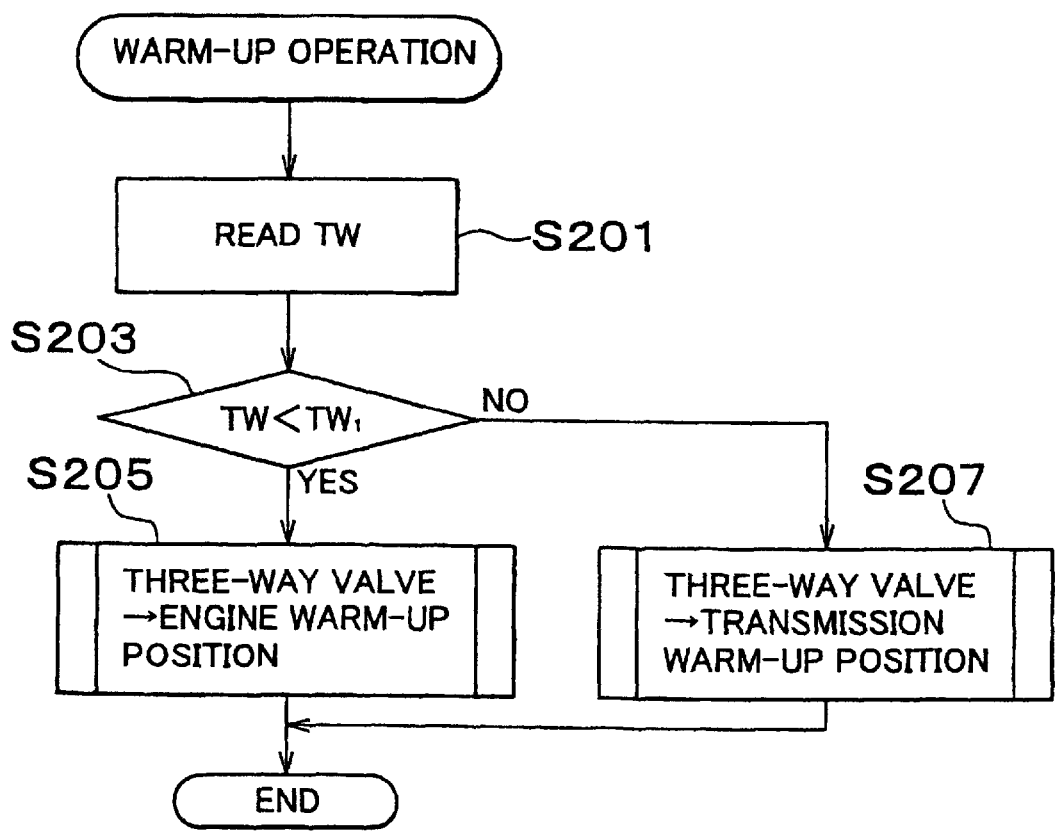
FIG. 16 is a warm-up control flowchart in the third embodiment.

FIG. 16 is a flowchart illustrating the warm-up control operation in the embodiment. This operation is performed by the ECU 19 at certain time intervals as a routine.

When the control flow shown in FIG. 16 starts, at a step 201, the present coolant temperature TW is read in from the coolant temperature sensor 105, and at a step 203, it is judged whether the read-in coolant temperature TW is lower than a predetermined temperature TW1 (for.example, a certain value of about 20 to 30° C.).

When TW is lower than TW1 at the step 203, the flow of processing goes to a step 205, and the position of the three-way valve 103 is switched to the position for connecting the pipe 69 to the pipe 41 (that is, the engine warm-up position). Thus, the warm coolant in the heat storage device is supplied only to the engine I, and the warm-up of the engine is Application No. 09/949,959 promoted. Then the coolant temperature TW reaches the predetermined value TW1 at the step 203, then step 207 is subsequently performed, and the position of the three-way valve 103 is switched to the position for connecting the pipe 43 (that is, the transmission warm-up position). Thus, after the engine I is warmed up, the warm coolant from the heat storage device I is supplied through the heater exchanger 21 of the transmission 22, and after the warm-up of the engine, therefore, the warm-up of the transmission 22 is promoted.

As mentioned above, when the warm-up is completed, and the coolant temperature is increased to a certain temperature, the thermostat 57 allows most of the coolant to flow into the radiator 53, and thus the amount of the coolant flowing through the heat storage device 1 is decreased.

In this embodiment, the whole amount of the warm coolant in the heat storage tank is supplied to the engine I until the engine coolant temperature TW reaches the predetermined value TW1, and the whole amount of warm coolant is supplied to the transmission 22 and after TW reaches TW1. However, the three-way valve 103 may be controlled to continuously change the distribution of the coolant such that the amount of the warm coolant supplied to the engine I is continuously decreased and the amount of the warm coolant supplied to the transmission is continuously increased as the coolant temperature TW is increased, and the whole amount of the warm coolant is.supplied to the transmission 22 when the coolant temperature reaches TW1.

Next, the forth embodiment of the invention will be described with reference to FIG. 17.

In the third embodiment, when the engine temperature (coolant temperature) TW exceeds the predetermined value TW1, the whole amount of the warm coolant from the heat storage device 1 is supplied to the ATF warmer of the transmission 22, irrespective of the temperature of the transmission. Actually, however, the cooling rate of the transmission temperature at the stoppage of the engine varies depending on the circumstances, and the transmission temperature may not be decreased so much while the engine is stopped. In such a case, the warm-up of the transmission 22 is completed in a short time, and it is no longer necessary to supply the warm coolant to the transmission 22. Therefore, after completion of the warm-up of the transmission 22, it is preferable that the warm coolant continues to be supplied to the engine I to further promote the warm-up of the engine I, instead of supplying the whole amount of the warm coolant to the transmission 22. In the transmission having a heat insulating structure in which insulating material is provided around the transmission oil pan, the transmission temperature may be hardly decreased while the engine is stopped. In such a case, it is not necessary to supply the warm coolant to the transmission 22 after the start of the engine.

In this embodiment, accordingly, the fluid temperature T0 detected by the transmission fluid temperature sensor 107 is used as a parameter representing the transmission temperature. When the transmission fluid temperature is a predetermined temperature or higher, the whole amount of the warm coolant from the heat storage device 1 is supplied to the engine I, even if the engine coolant temperature is TW1 or higher. Thus, the unnecessary operation for warming up the transmission is eliminated, and the warm-up of the engine I is further promoted.

Figure 17:
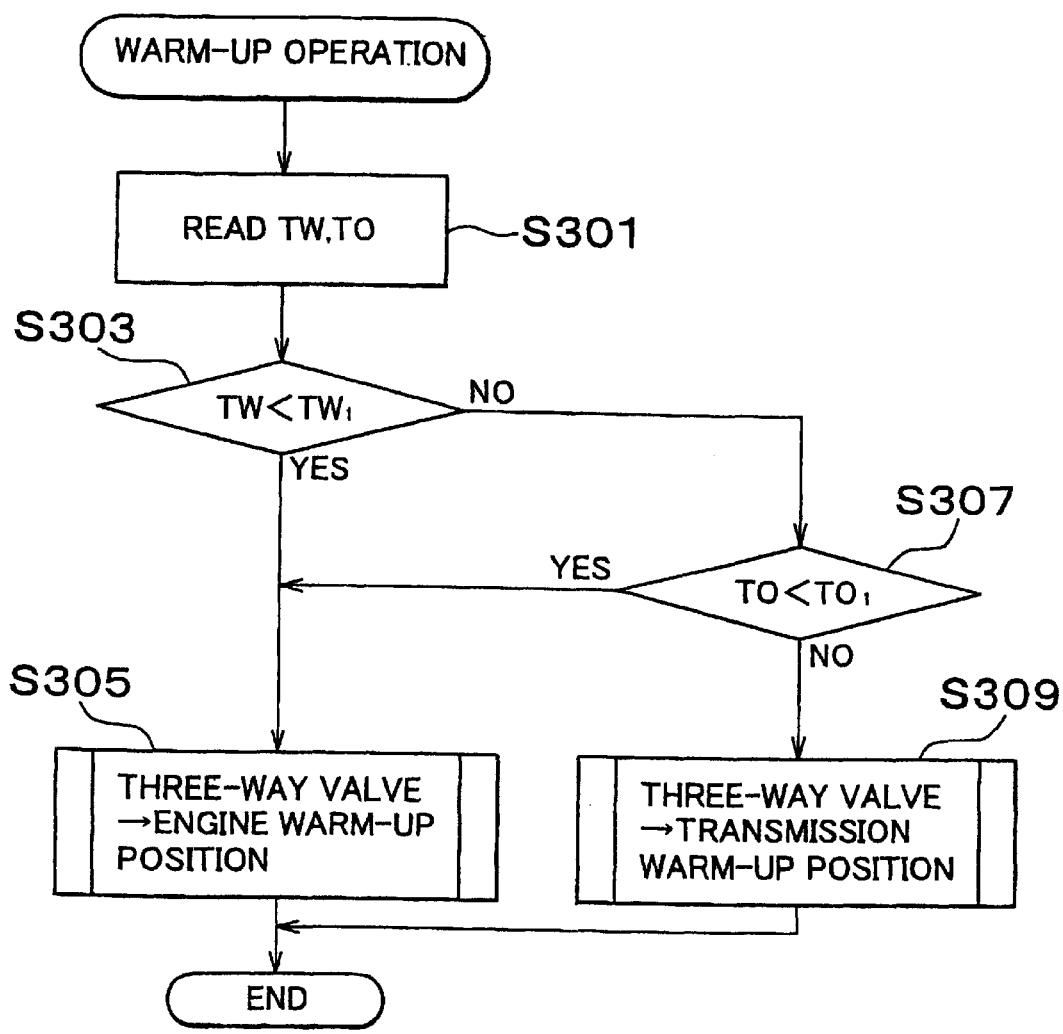
FIG. 17 is a warm-up control flowchart in a forth embodiment of the invention.

The warm-up control operation in FIG. 17 is performed by the ECU19 at certain time interval as a routine.

When the operation in FIG. 17 is started, at a step 301, the engine coolant temperature TW is read in from the coolant temperature sensor 105 and the transmission fluid temperature T0 is read in from the fluid temperature sensor 107. At a step 303, it is judged whether the present coolant temperature TW is lower than a predetermined temperature TW1. TW1 is set at a certain temperature in the range of 20 to 30° C., as in the third embodiment.

When TW is lower than TW1 at the step 303, the position of the three-way valve 103 is switched to the engine warm-up position at a step 305 as in the second embodiment, and the whole amount of the warm coolant from the heat storage device 1 is supplied to the engine I. When TW is TW1 or higher at the step 303, the flow of processing goes to a step 307. At the step 307, it is judged whether the present transmission fluid temperature T0 is higher than a predetermined value T01 (for example, T01 is approximately 60°

C.). When T0 is higher than T0 at step 307, the temperature of the transmission 22 is sufficiently high, and the operation for warming up the transmission 22 is not necessary. Therefore, the step 305 is performed, and the three-way valve 103 is maintained in the engine warm-up position. Thus, the warm coolant from the heat storage device 1 continues to be supplied to the engine I, and the warm-up of the engine I is further promoted.

On the other hand, when T0 is T01 or lower at the step 307, the temperature of the transmission 22 is low, and the operation for warming up the transmission 22 is necessary. Therefore, at a.step 309, the position of the three-way valve 103 is switched to the transmission warm-up position. Thus, as in the first embodiment, the warm coolant from the heat storage device 1 is supplied to the transmission after completion of the warm-up of the engine I, and the warm-up of the transmission 22 is promoted.

As described above, in the forth embodiment, when the operation for warming up the transmission 22 is not necessary, the whole amount of the warm coolant from the heat storage device 1 is supplied to the engine I, even if the engine coolant temperature is the predetermined value or higher. Therefore, the emission properties of the engine I and the drivability are improved in a short time.

In the forth embodiment, priority is given to the warm-up of the internal-combustion engine. When the transmission temperature is an allowable lower limit temperature or higher, the warm-up of the internal-combustion engine continues to be promoted. In addition, when the transmission is heat-insulated, the transmission temperature is not decreased to a large extent while the engine is stopped. Therefore, it is not necessary to perform the operation for promoting the warm-up. In such a case, only the minimum operation for promoting the warm-up of the transmission is performed, and the operation for promoting the warm-up of the internal-combustion engine is mainly performed. Thus, the operations for-promoting the warm-up are performed according to the temperature conditions of the internal-combustion engine and the transmission. In addition, priority is given to the warm-up of the internal-combustion engine.

Next, the fifth embodiment of the invention will be described with reference to FIG. 18.

In the third embodiment, priority is given to the warm-up of the engine, and the emission properties of the engine I and the drivability are improved early. Thus, the warm-up of the transmission 22 is relatively delayed, the fuel efficiency continues to deteriorate due to the increase in loss in the transmission 22 for a relatively long time during operation. By contrast, in the embodiment 5, priority is given to the warm-up of the transmission 22 which generally requires a long time for being warmed up as compared with the engine I in order to improve the fuel efficiency in a short time. The embodiment 5 is different from the embodiment 3 in this point.

Figure 18:
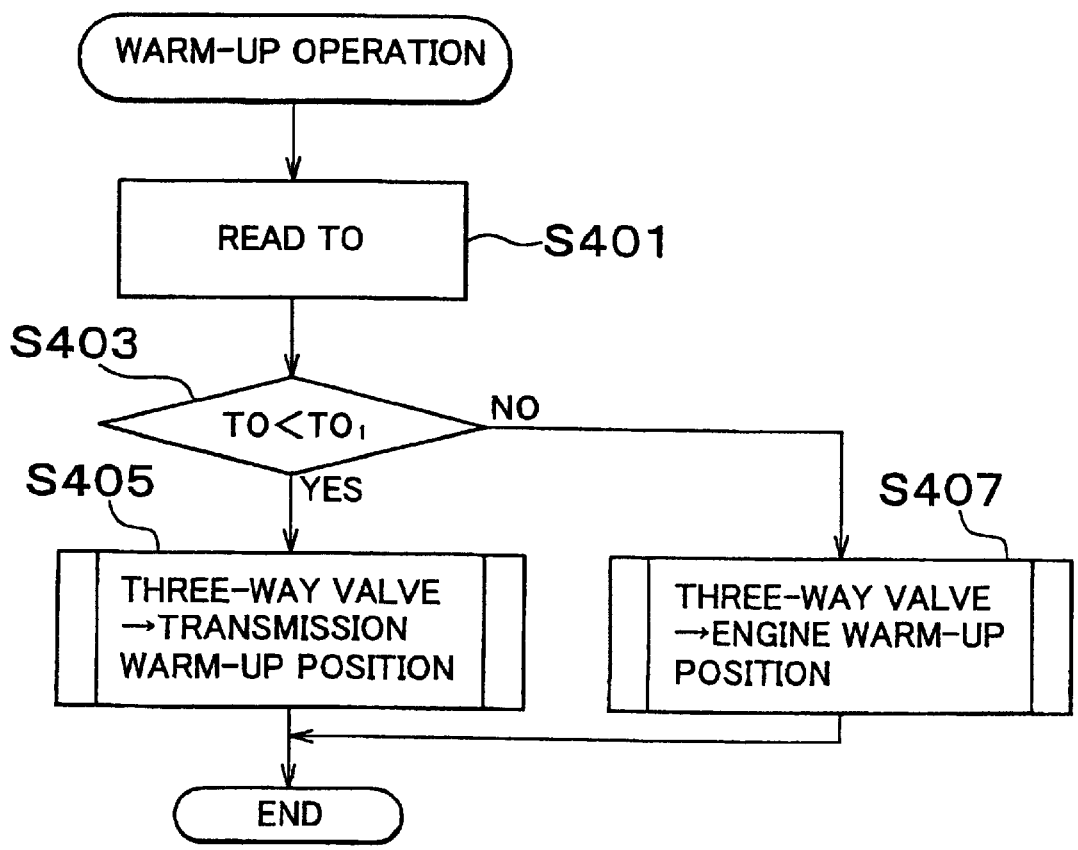
FIG. 18 is a warm-up control flowchart in a fifth embodiment of the invention.

The warm-up operation in FIG. 18 is performed by the ECU 19 at certain time intervals as a routine.

In the operation in FIG. 18, at step 401, the transmission fluid temperature T0 is read in from the fluid temperature sensor 107, and the whole amount of the warm coolant from the heat storage device 1 is supplied to the transmission until T0 reaches the predetermined fluid temperature T01 (T01 is approximately 60° C.) in the fifth embodiment, irrespective of the engine coolant temperature (steps 403, 405). Thus, the warm-up of the transmission 22 is promoted, and the fuel efficiency is improved in a short time after the start of the engine.

Figure 19:
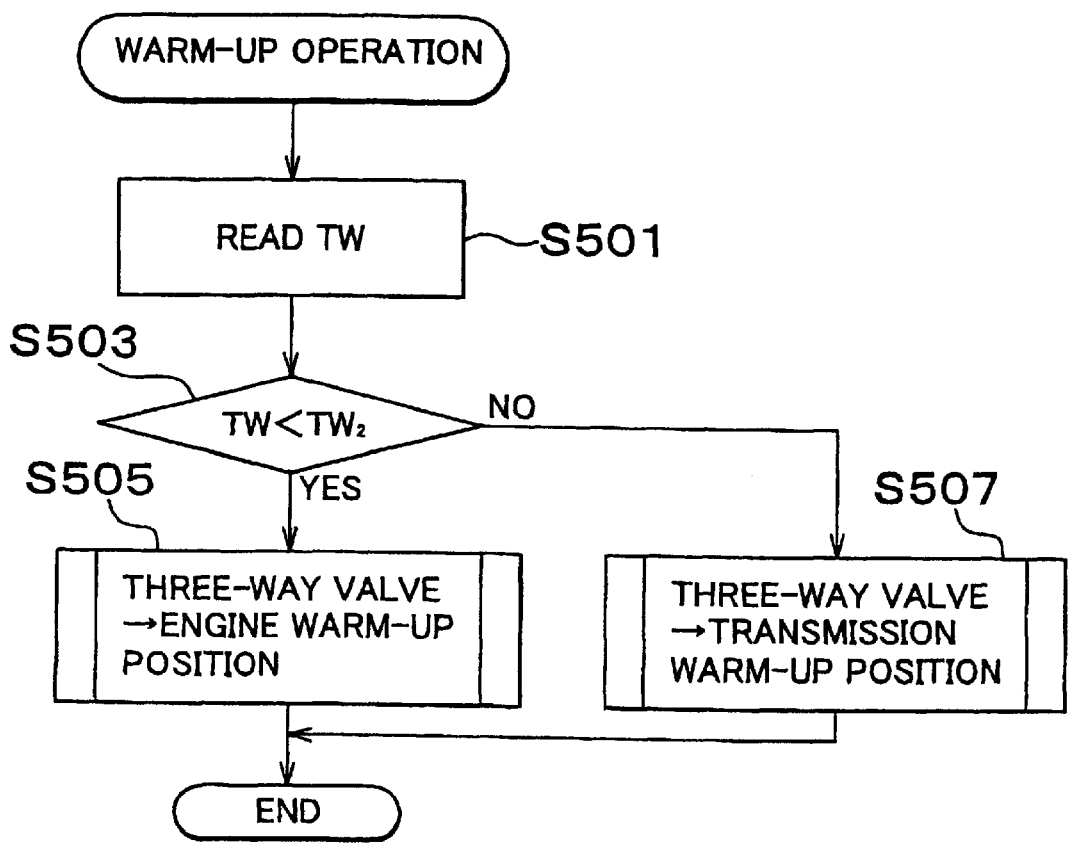
FIG. 19 is a warm-up control flowchart in a sixth embodiment of the invention.

Next, the sixth embodiment of the invention will be described with reference to FIG. 19.

The sixth embodiment is similar to the third embodiment (FIG. 16) in that the whole amount of the warm coolant from the heat storage device 1 is supplied to the engine I until the coolant temperature TW reaches the predetermined value. However, the sixth embodiment is different from the third embodiment in that a predetermined temperature TW2 (a step 503) is set at a value (for example, about 40° C.) higher than the predetermined temperature TW1 set in the third embodiment. In other words, in this embodiment, the warm coolant continues to be supplied to the engine I until the warm-up of the engine I proceeds further than in the third embodiment. Thus, the emission properties of the engine I and the drivability are improved in a shorter time than in the third embodiment. The flowchart shown in FIG. 19 is the same as the flowchart in FIG. 16 except the above-mentioned point. Therefore, detailed description is omitted.

Further, in the seventh embodiment, the warm-up operation is performed as in the third embodiments to the sixth embodiment. However, the transmission fluid stored in the transmission may be heated only partly, and not uniformly, when the transmission fluid is heated.

Figure 20:
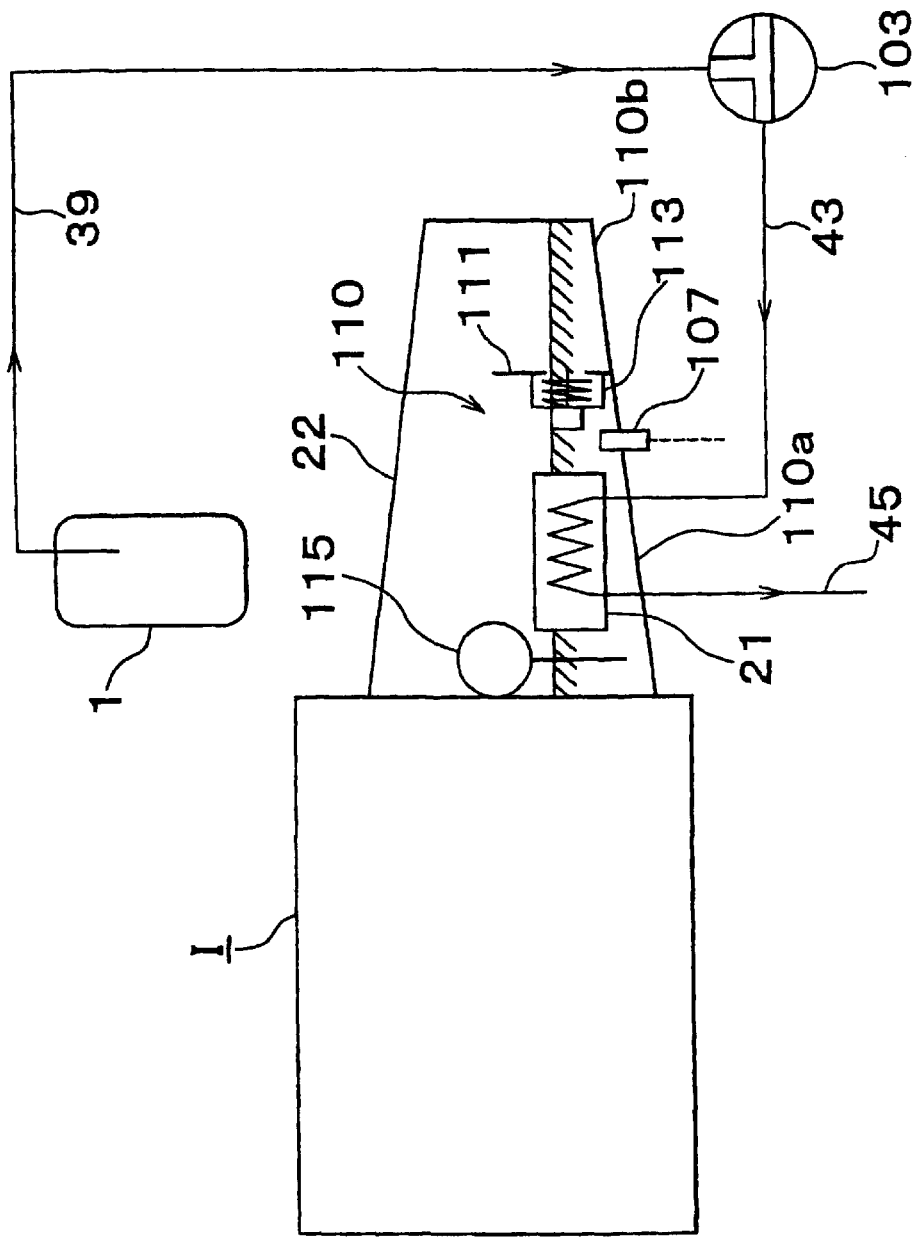
FIG. 20 is a schematic diagram showing a warm-up control device according to a seventh embodiment of the invention.

FIG. 20 is a schematic diagram showing the structure of the oil reservoir (oil pan) of the transmission 22 according to the embodiment.

In this embodiment, the oil pan 110 of the transmission 22 is provided with a partition wall 111, and the inside of the oil pan 110 is divided into two partitions 110a and 110b by the partition wall 111. In the embodiment, an oil pump 115 for circulating the transmission fluid in the transmission 22 is configured so as to circulate only the transmission fluid in the partition 110a of the two partitions 110a and 110b. The suction pipe and discharge pipe (not illustrated) of the pump 115 are opened in the partition 110a. The ATF warmer 21 for exchanging heat between the warm coolant supplied from the heat storage device 1 and the transmission fluid is provided in this partition 110a. Furthermore, in the embodiment, the partition wall 111 is provided with a communication hole for making a communicative connection between the partitions 110a and 110b and a thermostat 113 for interrupting the communication through the communication hole. The thermostat 113 opens its valve when the fluid temperature in the partition 110a is a predetermined temperature or higher, and allows the partitions 110a and 110b to communicate with each other through the communication hole.

In other words, when the transmission fluid temperature is low, the warm coolant supplied from the heat storage device 1 heats only the transmission fluid in the partition 110a, and the pump 115 allows only this heated transmission fluid to circulate in the transmission 22. In the transmission 22, the transmission fluid amount of which is larger than the amount required in the transmission 22 is stored in order to decrease the frequency with which the fluid needs to be changed due to deterioration of the fluid. Therefore, there is a problem that it takes a long time to increase the temperature of the transmission 22, if the whole amount of the transmission fluid is uniformly heated. In the embodiment, the oil pan 110 is divided into the partitions 110a and 110b , and only the transmission fluid in the partition 110a is heated and circulated. Thus, the temperature of the transmission fluid which is actually circulating can be increased in a short time. After the transmission fluid temperature is sufficiently increased due to the operation of the transmission, the thermostat 113 opens its valve, and allows the partitions 110a and 110b to communicate with each other. Therefore, the whole amount of the transmission fluid stored in the transmission 22 circulates in the transmission 22, so that deterioration of the transmission fluid is suppressed.

In other words, only part of the lubricating oil stored in the transmission is circulated during warm-up, and the remainder is not circulated. The coolant stored in the heat storage device is used for heating only the lubricating oil circulating in the transmission. In the transmission, the lubricating oil amount of which is larger than the minimum required amount is stored in order to prevent an increase in the frequency with which the lubricating oil needs to be changed due to deterioration of the lubricating oil. Therefore, it takes a relatively long time to increase the temperature of the whole amount of the lubricating oil. In the invention, for example, the oil tank (oil pan) for the lubricating oil is separated by the partition wall, and only the lubricating oil in one of the partitions separated by the partition wall circulates in the transmission. In addition, only the lubricating oil in this partition is heated during warm-up. Thus, the amount of the lubricating oil to be heated during warm-up is decreased, and the transmission can be heated in a short time. After the warm-up is completed and the lubricating oil temperature is sufficiently increased in the above-mentioned partition, the partition for the lubrication oil used for circulation and the partition for the lubricating oil which are not used for circulation are allowed to communicate with each other. Accordingly, after the warm-up is completed, the whole amount of the lubricating oil circulates in the transmission. Therefore, deterioration of the lubricating oil is suppressed, thereby preventing an increase in the frequency with which lubricating oil needs to be changed.

According to the invention, the coolant stored in the heat storage device can be efficiently distributed to the internal-combustion engine and transmission or other drive devices as required.

What is claimed is:

1. A warm-up control device for an internal-combustion engine, comprising:
   a heat storage device that stores a heating medium heated during operation of the internal-combustion engine;
   a first path that supplies the heating medium from the heat storage device to the engine;
   a second path that supplies the heating medium from the heat storage device to a drive device, having a heat exchanger for exchanging heat between the heating medium passing through the engine and a hydraulic fluid;
   a circulation path that allows the heating medium to pass through the engine without passing through the heat storage device; and
   a controller that selects at least one of the first path, the second path, and the circulation path as a path for supplying the heating medium to at least either of the engine or the drive device according to the temperature rising condition of the engine,
   wherein the controller supplies the heating medium to the engine through the first path prior to the start of the engine or at the start of the engine, and supplies the heating medium to the drive device through the second path while maintaining a condition where the heating medium circulates in the circulation path after the start of the engine.

2. The warm-up control device according to claim 1, wherein the first path and second path communicate with each other, and the controller supplies the heating medium to the location requiring temperature rise through the engine prior to the start of the engine or at the start of the engine.

3. The warm-up control device according to claim 1, wherein the drive device is a transmission for transmitting power of the engine to wheels.

4. A warn-up control device for an internal-combustion engine, comprising:
   a heat storage device that stores a heating medium heated during operation of the internal-combustion engine;
   a first path that supplies the heating medium from the heat storage device to the engine;
   a second path that supplies the heating medium from the heat storage device to a drive device having a heat exchanger for exchanging heat between the heating medium passing through the engine and a hydraulic fluid;
   a first sensor that detects the temperature of the engine;
   a second sensor that detects the temperature of the drive device; and
   a setting device that sets the ratio between the amount of the heating medium supplied to the engine through the first path and the amount of the heating medium supplied from the heat storage device to the drive device through the second path, on the basis of the engine temperature detected by the first sensor and the temperature of the location requiring temperature rise detected by the second sensor.

5. The warm-up control device according to claim 4, wherein the setting device sets the ratio between the amount of the heating medium supplied from the heat storage device to the internal-combustion engine and the amount of the heating medium supplied from the heat storage device to the drive device such that the amount of the heating medium supplied from the heat storage device to the internal-combustion engine is larger than the amount of the heating medium supplied from the heat storage device to the drive device when the detected engine temperature is a predetermined temperature or lower.

6. The warm-up control device according to claim 4, wherein the setting device sets the ratio between the amount of the heating medium supplied from the heat storage device to the internal-combustion engine and the amount of the heating medium supplied from the heat storage device to the drive device such that the amount of the heating medium supplied from the heat storage device to the drive device is larger than the amount of the heating medium supplied from the heat storage device to the internal-combustion engine when the detected engine temperature is a first predetermined temperature or higher.

7. The warm-up control device according to claim 6, wherein the setting device sets the ratio between the amount of the heating medium supplied from the heat storage device to the internal-combustion engine and the amount of the heating medium supplied from the heat storage device to the drive device such that the amount of the heating medium supplied from the heat storage device to the internal-combustion engine is larger than the amount of the heating medium supplied from the heat storage device to the drive device when the temperature of the location requiring temperature rise is a second predetermined temperature or higher, even if the detected engine temperature is the first predetermined temperature or higher.

8. The warm-up control device according to claim 4, wherein the setting device sets the ratio between the amount of the heating medium supplied from the heat storage device to the internal-combustion engine and the amount of the heating medium supplied from the heat storage device to the drive device such that the amount of the heating medium supplied from the heat storage device to the drive device is larger than the amount of the heating medium supplied from the heat storage device to the internal-combustion engine from the start of the engine until the temperature of the drive device reaches a predetermined temperature, and sets the ratio between the amount of the heating medium supplied from the heat storage device to the internal-combustion engine and the amount of the heating medium supplied from the heat storage device to the drive device such that the amount of the heating medium supplied from the heat storage device to the internal-combustion engine is larger than the amount of the heating medium supplied from the heat storage device to the drive device after the temperature of the location requiring temperature rise reaches the predetermined temperature.

9. The warm-up control device according to claim 4, wherein the setting device sets the ratio between the amount of the heating medium supplied from the heat storage device to the internal-combustion engine and the amount of the heating medium supplied from the heat storage device to the drive device such that the amount of the heating medium supplied from the heat storage device to the internal-combustion engine is larger than the amount of the heating medium supplied from the heat storage device to the drive device from the start of the engine until the temperature of the internal-combustion engine reaches a predetermined temperature, and sets the ratio between the amount of the heating medium supplied from the heat storage device to the internal-combustion engine and the amount of the heating medium supplied from the heat storage device to the drive device such that the amount of the heating medium supplied from the heat storage device to the drive device is larger than the amount of the heating medium supplied from the heat storage device to the internal-combustion engine after the temperature of the internal-combustion engine reaches the predetermined temperature.

10. The internal-combustion engine according to claim 7, wherein the drive device is a transmission for transmitting power of the engine to wheels.

11. The warm-up control device according to claim 10, wherein the transmission includes a supply device that allows only part of lubricating oil stored in the transmission to circulate in the transmission during warm-up, and a heating device that heats only the part of the lubricating oil using the heating medium supplied from the heat storage device.

12. A warm-up control method for an internal-combustion engine, having a heat storage device that stores a heating medium heated during operation of the internal-combustion engine, comprising:

supplying a heating medium stored in the heat storage device to a drive device, having a heat exchanger that exchanges heat between the heating medium passing through the engine and a hydraulic fluid, through the engine prior to the start of the internal-combustion engine or at the start of the engine; and supplying the heating medium stored in the heat storage device to the drive device while maintaining a condition where the heating medium is circulated in the path excluding the heat storage device and including the engine after the start of the engine.

13. The control method according to claim 12, wherein the drive device is a transmission for transmitting power of the engine to wheels.

14. A warm-up control method for an internal-combustion engine, having a heat storage device that stores a heating medium heated during operation of the internal-combustion engine while maintaining its temperature, comprising:

supplying the heating medium stored in the heat storage device to the engine prior to the start of the internal-combustion engine or at the start of the engine, and circulating the heating medium in a path excluding the heat storage device and including the engine after the start of the engine, and then supplying part of the circulating heating medium to a drive device, having a heat exchanger that exchanges heat between the heating medium passing through the engine and a hydraulic fluid, without passing the part of the circulating heating medium through the heat storage device.

15. The control method according to claim 14, wherein the drive device is a transmission for transmitting over of the engine to wheels.

16. A warm-up control method for an internal-combustion engine, having a heat storage device that stores a heating medium heated during operation of the internal-combustion engine, that performs warm-up by supplying the heating medium stored in the heat storage device to the internal-combustion engine and to a drive device, having a heat exchanger for exchanging heat between the heating medium passing through the engine and a hydraulic fluid, prior to the start of the engine or at the start of the engine, comprising:

detecting the temperature of the engine;

detecting the temperature of the drive device; and setting the ratio between the amount of the heating medium supplied to the engine and the amount of the heating medium supplied to the drive device on the basis of the engine temperature detected by the first sensor and the temperature of the drive device determined by the second sensor.

17. A warm-up control device for an internal-combustion engine, comprising:

a heat storage device that stores a heating medium heated during operation of the internal-combustion engine;

a first path that supplies the heating medium from the heat storage device to the engine;

a second path that supplies the heating medium from the heat storage device to a drive device, having a heat exchanger for exchanging heat between the heating medium passing through the engine and a hydraulic fluid;

a circulation path that allows the heating medium to pass through the engine without passing through the heat storage device;

a third path communicating with the circulation path, that allows the heating medium to pass through the drive device without passing through the heat storage device; and a controller that selects at least one of the first path, the second path, and the circulation path as a path for supplying the heating medium to at least either of the engine or the drive device according to the temperature rising condition of the engine, and the controller supplies the heating medium to the engine through the first path prior to the start of the engine or at the start of the engine, and supplies part of the heating medium to the drive device through the third path.

18. The warm-up control device according to claim 17, wherein the drive device is a transmission for transmitting power of the engine to wheels.

* * * * *